Oct. 13, 1970 C. CHRISTENSEN ET AL 3,534,338

COMPUTER GRAPHICS SYSTEM

Filed Nov. 13, 1967 8 Sheets-Sheet 1

INVENTORS C. CHRISTENSEN
E. N. PINSON
BY R. O. Nimtz
ATTORNEY

COMPUTER GRAPHICS SYSTEM

United States Patent Office 3,534,338
Patented Oct. 13, 1970

3,534,338

COMPUTER GRAPHICS SYSTEM

Carl Christensen, Murray Hill, and Elliot N. Pinson, New Providence, N.J., assignors to Bell Telephone Laboratories, Incorporated, Murray Hill, N.J., a corporation of New York Filed Nov. 13, 1967, Ser. No. 682,249
Int. Cl. G06f 3/14
U.S. Cl. 340—172.5 12 Claims

ABSTRACT OF THE DISCLOSURE

An interactive computer-driven CRT display system is described. This system features at least one local console for interacting with a large time-shared central computer. Each console includes a small general purpose computer, special purpose display hardware and software, and several input means, including a light pen.

This invention relates to computer systems. More particularly, this invention relates to input/output systems for digital computers. Still more particularly, this invention relates to graphical input/output systems for allowing real-time, on-line interaction between a user and a digital computer.

Subject matter relating to the present invention is also contained in U.S. patent application Ser. No. 682,280 filed this date by W. H. Ninke and assigned to the assignee of the present invention.

BACKGROUND OF THE INVENTION

Recent developments in computer systems and applications have emphasized the great need for improved man-machine communication. Top level businessmen employing computers in decision making processes can rarely be expected to perform the programming gymnastics often required for efficient computer utilization. Likewise, engineers developing complex electronic systems with the aid of a computer prefer to deal with the computer on terms familiar to them, rather than delving into the intricacies of programming.

One attempt to improve communication across the man-machine interface has been in the field of interactive computer graphics. Typically, a user identifies and otherwise operates on data supplied by a computer and displayed on a cathode ray tube (CRT). These operations are performed by means of a light-sensitive input device or by auxiliary input means including teletypewriter signals. Using such techniques, it is possible for an electrical circuit designer, for example, to generate, modify, and relocate standard and special-purpose circuit components displayed on a CRT. When additional computational ability is available, it is often possible for a user to submit circuit parameter values and have typical response curves displayed almost immediately. Business, scientific, and other nonengineering applications of such interaction with a computer are at once apparent.

The early "sketchpad" computer system featuring graphical input-output using a CRT has been described in a paper by I. E. Sutherland entitled "A Man-Machine Graphical Communication System," Proceedings of SJCC, vol. 23, Spartan Books, Inc., 1963, pp. 305–322. Another interactive graphic system known as DAC–I has been described in a paper by E. L. Jacks entitled "A Laboratory for the Study of Graphical Man-Machine Communication," Proceedings of FJCC, vol. 26, Spartan Books, Inc., 1964, pp. 343–350.

Each of these systems contains only a single user console, and used the full facilities of a large scale computer thereby limiting availability to a single user at a time.

Because the processing capabilities of many large computers for exceeds the demands furnished by a single console, efforts have been made to provide access to a large computer system from a number of consoles, hopefully without diminishing the problem-solving power or degrading the response times at each console as compared with the single-console systems.

Several ways have been tried to achieve efficient multi-console operation. In one, a plurality of consoles have been attached through a controller to a large computer. The controller has either a core or drum memory which provides repetitively-scanned stored graphical data to supply picture maintenance for the console CRT's. In one adaptation of this organization, separate computer memory partitions are dedicated to programs for each console. An interrupt-centered monitor acts in response to every console input device manipulation to pass control to the appropriate basic resident programs. These basic programs may pass control to further programs which may be resident in the memory partition, or which may first have to be loaded from secondary storage. When service is not required by the consoles, a background load is serviced using the remaining computer core storage. The memory partitions needed for a reasonably powerful console are large in size, so that the number of consoles which can be supported by one system is small, typically two.

In another adaptation, separate computer memory partitions are not dedicated to each console. Instead a common framework with dynamic subroutine loading and memory management system is used to serve several consoles. A system using this approach has been described by J. R. Kennedy in "A System for Time-Sharing Graphic Consoles," Proceedings of FJCC, vol. 29, Spartan Books, Inc., 1966, pp. 211–222, and has successfully operated with three consoles. Even for this number of consoles, total dedication of a fairly large scale computer to graphic consoles has been required.

For these controller-centered systems, significant problem solving power is accessible from each console. Actions at one console, however, can interfere with response times at others. Because if the high information transfer rate, location of the console beyond a few hundred feet from the computer is not generally possible.

Other related efforts in the computer graphics field have been described in R. H. Stotz and J. E. Ward, "Operating Manual for the ESL Display Console," Electronic Systems Laboratory, M.I.T., Cambridge, Mass., ESL 9442–M–129, Mar. 9, 1965; C. A. Lang, "New B-Core System for Programming the ESL Display Console," Electronic Systems Laboratory, M.I.T., Cambridge, Mass., ESL 9442–M–122, Apr. 30, 1965; and J. Katsenelson et al., "A Program for On-Line Analysis of Electronic Circuits," IEEE International Convention, March 1967. There, a graphic display is maintained by direct CRT refreshing from a large time-shared computer. All console actions are monitored and acted on directly by this large time-shared computer. Using this organization, the anticipated economic gains of time-sharing and the possibility of multiple consoles have not been achieved. The direct connection of even the single console causes excessive overhead for picture maintenance and also considerable scheduling overhead and poor response, again because the central computer must attend to every console device manipulation. During console usage, degradation of service to other computer system users also results.

A third approach has sought not to connect a display console directly to a large central processor, but to interpose a small general purpose computer between the user and the large processor. Systems using this organization have been the GRAPHIC-1 system described, for example, in the paper by W. H. Ninke entitled "GRAPHIC-1—A Remote Graphical Display Console System,"

Proceedings of FJCC, vol. 27, Spartan Books, 1965, pp. 834–846, and SCHOOLER described in N. A. Ball et al. "A Shared Memory Computer Display System," IEEE Transactions on Electronic Computers, vol. EF–15, p. 750. The small computer, located at the display console, handles the real-time response processing obligations associated with manipulation of the console input devices. It provides picture maintenance or refreshing by sequentially and repetitively scanning data signals stored in local memory. It also accumulates work it cannot perform for action by the large computer and supervises communications back and forth between the console and the large computer. These so-called satellite systems have been connected to processors operating in a batch processing mode. Console access to the central computer to have complex computations performed has been permitted only between batch jobs. Using a satellite console system, significant efficiencies can be realized by dividing a task into a composing phase handled by the local computer and a complex processing phase handled by the central computer. This technique has been described in a circuit-analysis-by-computer context by H. C. So in "OLCA: An On-line Circuit Analysis System" IEEE Int. Conv. Rec., 1967. The psychological desire of a user for rapid response to simple requests during the composing phase has been adequately satisfied by the local computer. Waiting time to gain access to the large computer has ranged between a few seconds and several minutes. Users have been somewhat tolerant of these delays, however, because they realize that they have asked for significant processing, and, once they gain access, the computer is totally dedicated to their work.

If user delays and decreased flexibility of interaction were accepted, graphic input/output terminals of the several types mentioned above could concenivably be attached in multiples in a batch processing computer system. The limitations imposed on users in such a system are fundamental because the batch processing organization enforces a rigid time division of tasks.

An alternative and greatly improved organization according to the present invention is centered around a large time-shared central computer whose memory and processing faculties are allocated in part to each of a plurality of satellite graphic terminals on a time-division multiplexed basis. Each individual computing task required of the central computer by a graphic terminal need not necessarily be completed any more rapidly, but the central computer will, in general, be cognizant of each request much more quickly. Thus, a second or subsequent request for processing by a satellite graphic terminal will be noted and perhaps partially completed before a previous request from another terminal is completely fulfilled. Very rapid response to the user at the local console is possible because of the substantial processing power available through the use of a small general purpose computer that is part of the local terminals.

With access time considerably improved over a batch processing system, a more dynamic interplay between the user at the satellite console and the entire computer system is possible in a time-shared environment. Better allocation of both local and central processing resources is possible in a time-sharing graphic display system of the type contemplated by the present invention.

Another advantage of having a small computer as part of the satellite console for interacting with a time-shared central computer according to the present invention is the reduction of communications bandwidth requirements between the local satellite console and the central computer. In prior art satellite console systems, communication bandwidth requirements are high. The consoles are required to be close enough to the supporting central computer to be directly connected by high-capacity coaxial cable connection. In fact, because the high speed central computers are totally dedeciated during the batch slot allocated to the console, such a high capacity connection is required if the central computer is not to stand idle much of the time.

SUMMARY OF THE INVENTION

Briefly stated, the present invention provides graphic console man-machine interaction in a time-shared computer environment. Means are provided for efficiently entering, displaying, modifying, editing and otherwise processing data in several forms. One or more consoles or graphic terminals are provided, each having independent input/output facilities, picture maintenance facilities, and limited local programmed data processing capabilities. The local programmed processor conveniently takes the form of a small general purpose local computer which, in addition to providing console operations, acts as the intermediary for the display and the larger time-shared central computer. Extensive processing, including that requiring large amounts of storage, are conveniently performed by the central computer which then communicates results to the local computer over low capacity channels. Equivalent files of structured graphical data are maintained at the local and central computers, and means are provided to up-date these files when changes are dictated by user direction or because of computational results.

Other particular features of the present invention include means for dynamically handling display material as it tends to pass beyond the physical boundaries of the CRT. Means are also provided for efficiently storing data signals in a highly structured form which lends itself to ready interpretation by the local computer processor.

Additionally, means are provided for synchronizing stored data and instructions in the local and central computers.

These and other aspects of the present invention will be described in detail below with reference to the attached figures wherein.

FIGS. 5A–F show typical display word formats.

Figure 5A:
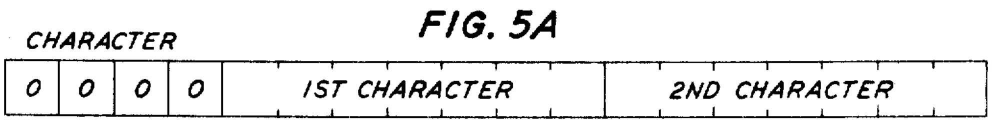
Figure 5B:
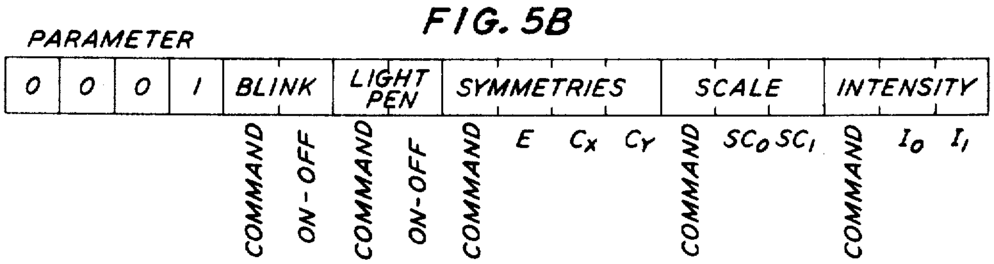
Figure 5C:
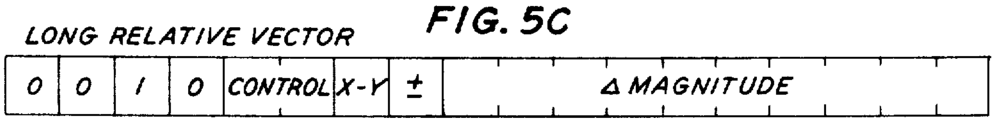
Figure 5D:
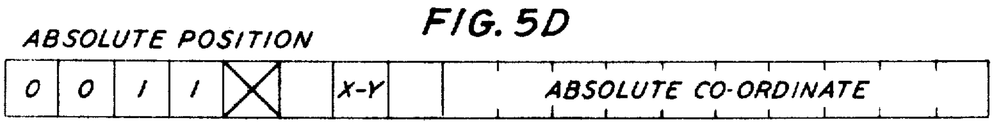
Figure 5E:
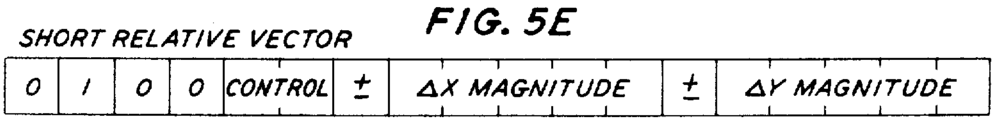
Figure 5F:
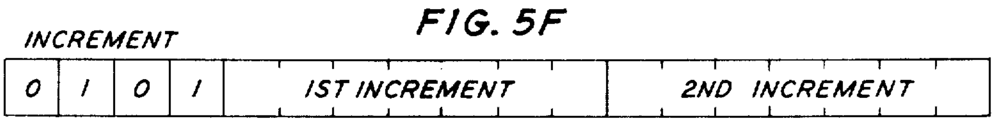
Figure 5G:
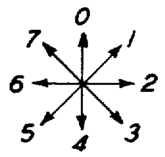

FIG. 5G illustrates the various alternatives possible with an increment mode feature of the present invention.

Figure 5H:
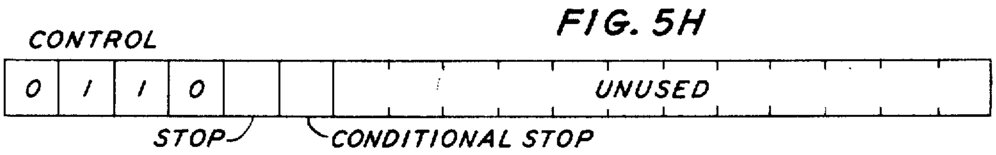
Figure 5I:

FIGS. 5H and I show typical display word formats.

Figure 6:
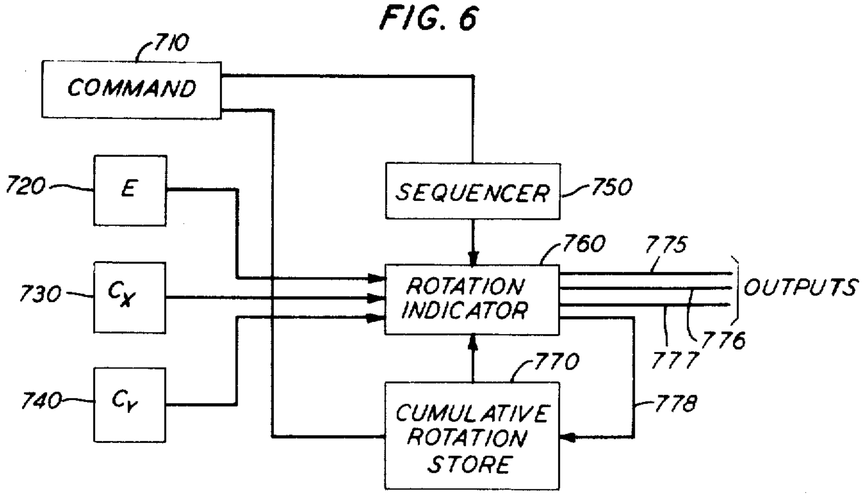

FIG. 6 illustrates a circuit for performing certain aspects of a symmetry transformation according to the present invention.

Figure 7:
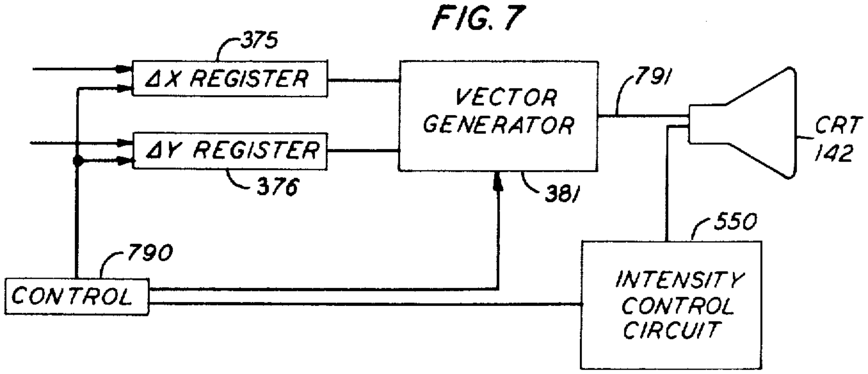

FIG. 7 shows a CRT and associated circuitry used in one aspect of the present invention.

Figure 8:
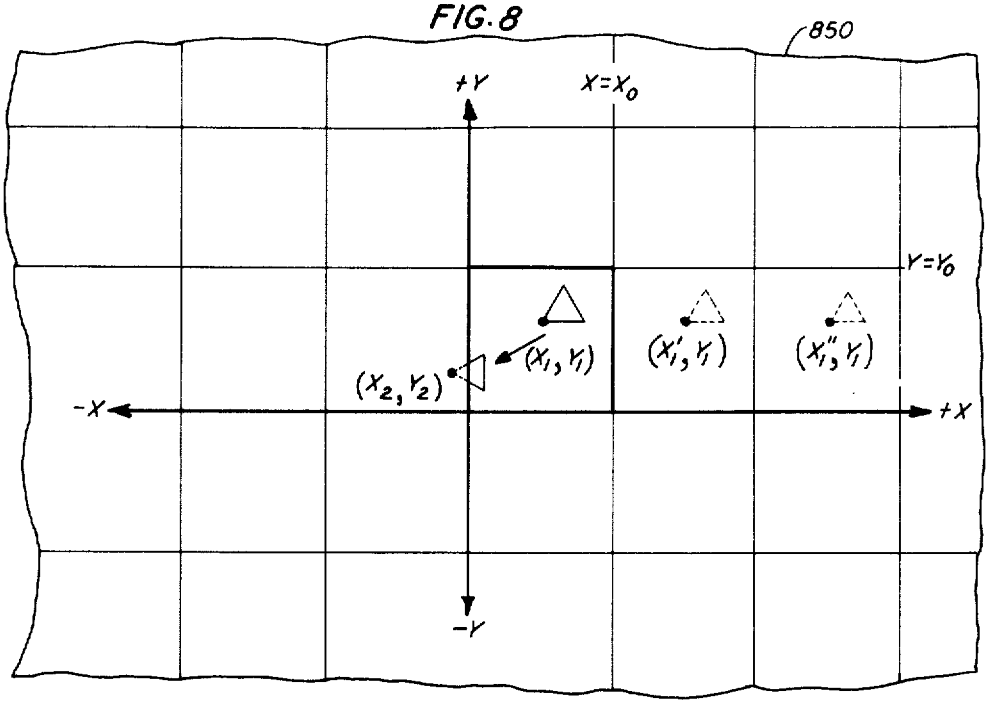

FIG. 8 illustrates an actual viewing window superimposed on a large potential viewing surface available using the present invention.

Figure 9:
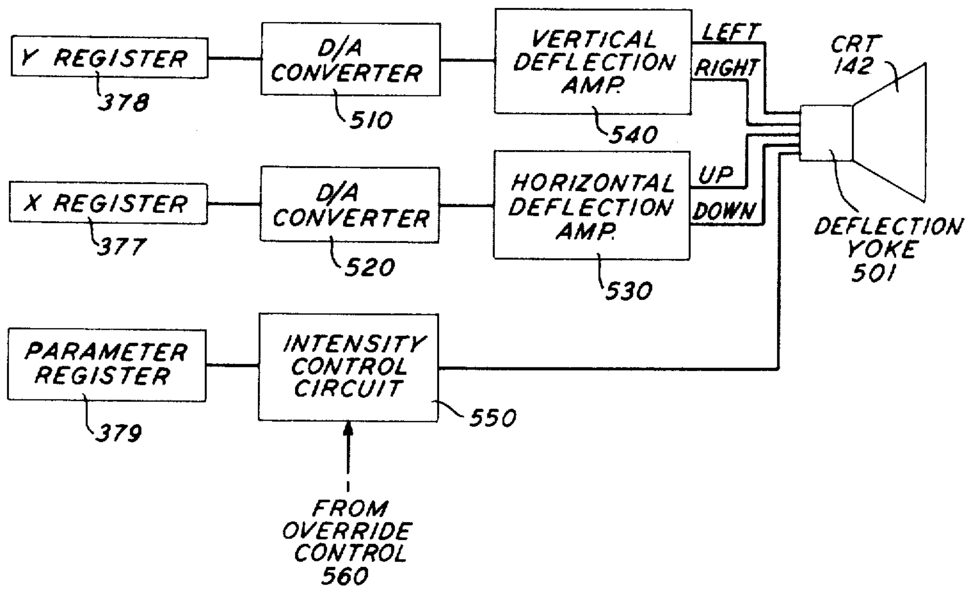

FIG. 9 shows circuitry for effecting control over the intensification control of a CRT when edge violations are detected according to one embodiment of the present invention.

Figure 10:
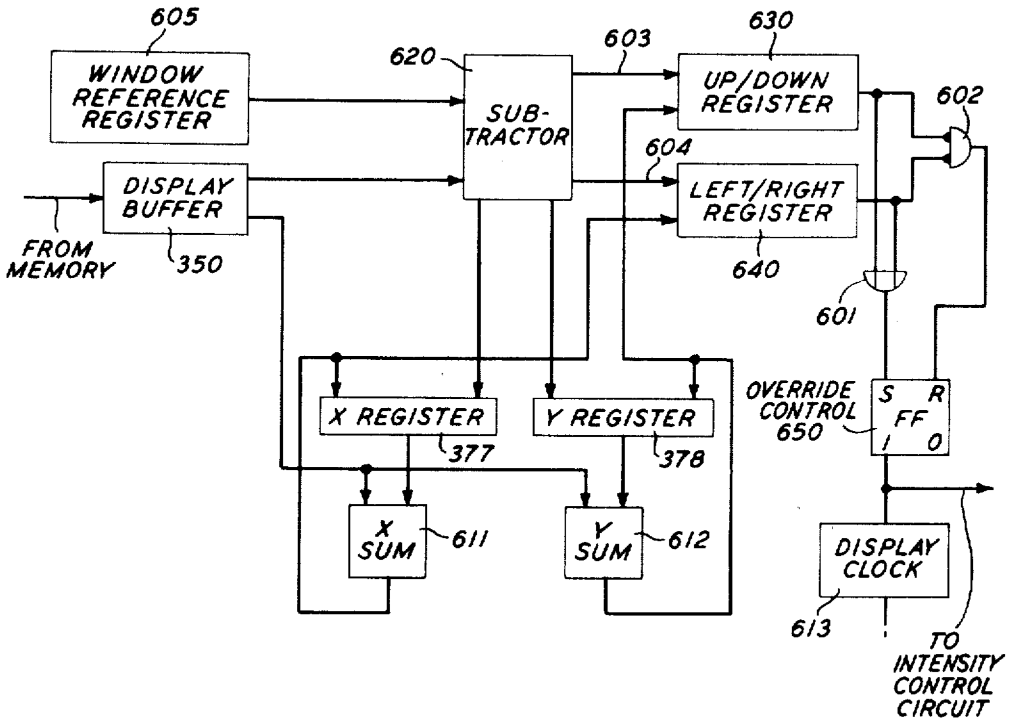

FIG. 10 shows additional circuitry according to one embodiment of the present invention for generating override signals when edge violations occur.

Figure 11:
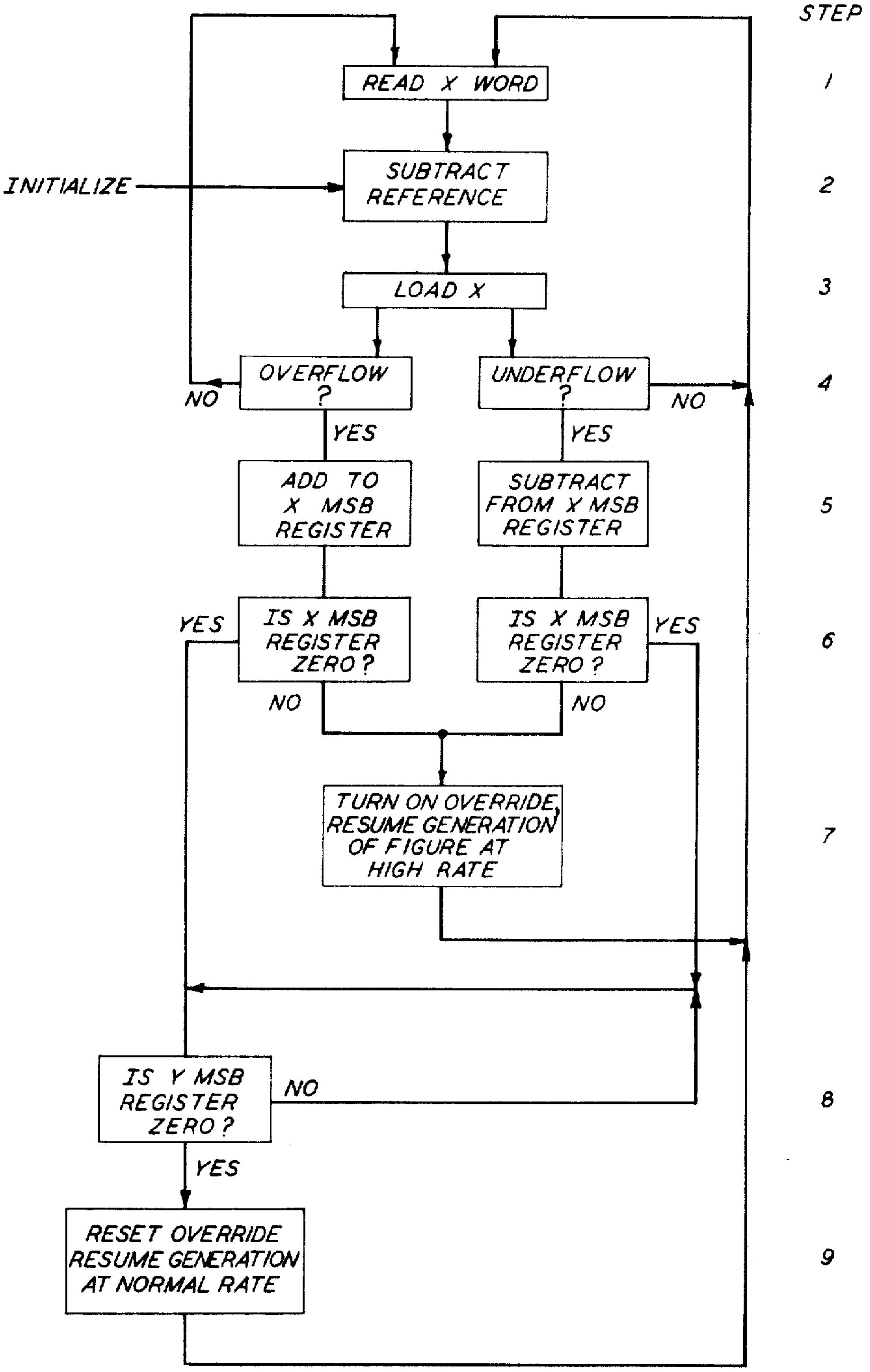

FIG. 11 is a flow chart illustrating an edge-violation-handling algorithm according to one embodiment of the present invention.

Figure 12:
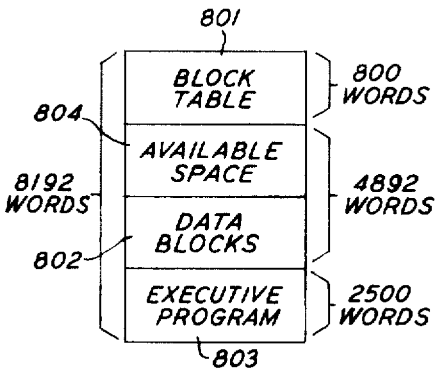

FIG. 12 shows a typical console memory space assignment.

Figure 13:
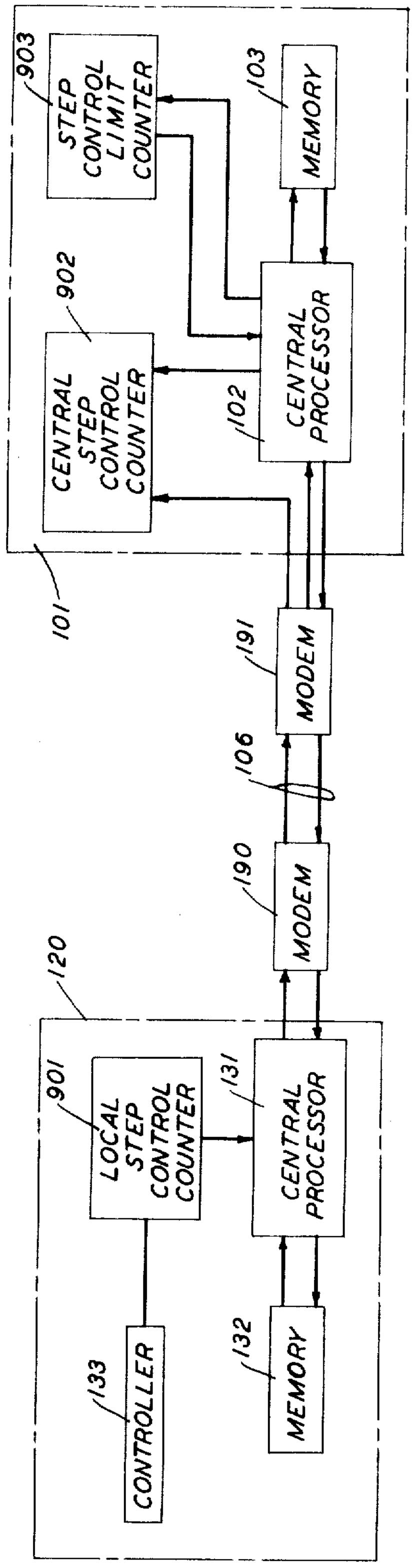

FIG. 13 illustrates circuitry for effecting synchronization of local and central computers according to one embodiment of the present invention.

INTRODUCTION AND GENERAL DESCRIPTION

This section will describe in some detail the overall organization of one illustrative embodiment of the present invention in the form of a time-shared computer graphics system. Subsequent sections will describe each of the several principal features of the present invention in greater detail and will illustrate how each feature contributes to the overall effectiveness of the system described.

Figure 1:
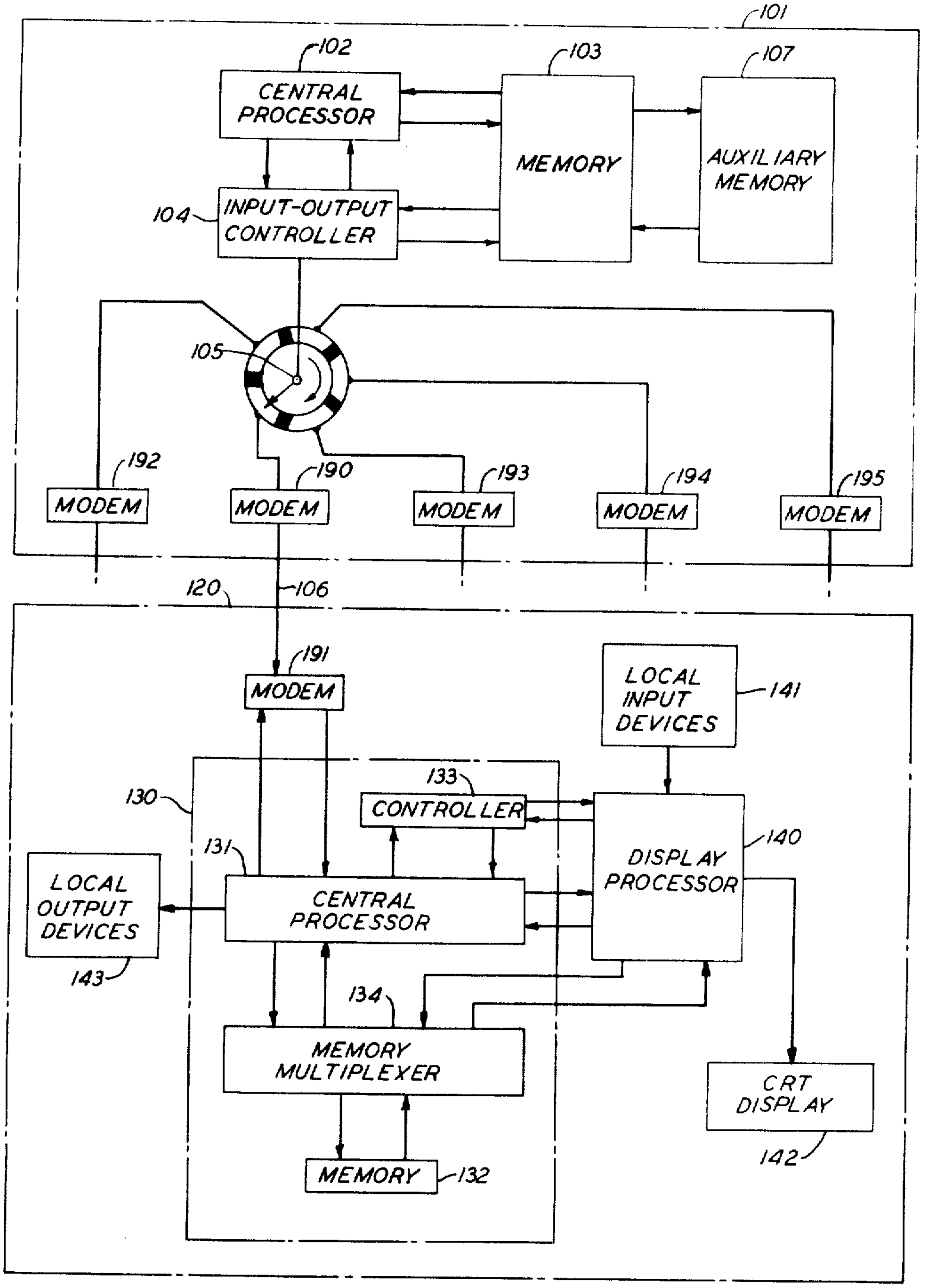
FIG. 1 is a block diagram of a satellite computer graphics system according to one embodiment of the present invention.

FIG. 1 shows a broad functional block diagram of an illustrative embodiment of the present invention. Central computer 101 is typically a large time-shared general purpose computer having a central processor 102 and large high-speed memory 103. Input/output functions are directed by input/output controller 104. The time-sharing aspects of central computer 101 are additionally represented by scanner 105, with each scan point connected to a user location by an appropriate modem 190 or 192–195 and a communication channel such as 106. Auxiliary storage, typically in the form of magnetic tape and/or magnetic disk units, is indicated by auxiliary store 107.

Also shown in FIG. 1 is a computer graphics terminal or local console 120 comprising a small general purpose local computer 130 and a special purpose display processor 140. Also included in the graphics terminal illustrated in FIG. 1, and conveniently grouped in a single console with the local computer 130 and display processor 140, are the several input devices 141, a cathode ray tube display 142 and other output devices 143. The input devices include a light sensitive probe, and may additionally include a digital tape reader and a keyboard. The output devices include the well-known printing and punching devices usually associated with general purpose computers. Additional input information is provided by a set of momentary contact pushbuttons.

Modem 191 is complementary to modem 190 at central computer 101 and performs the bilateral transformation between channel and computer-compatible data signals.

Local computer 130 comprises a central processor 131, a random access memory 132, and additional circuitry for interacting with the display processor 140 conveniently grouped as controller 133. The memory 132 is of moderate capacity to provide, at reasonable cost, storage of display data for interacting with display processor 140 and supervisory, function generating, and other program data. Memory 132 is shared by the local computer itself and display processor 140. This sharing is accomplished using memory multiplexor 134.

The local computer may be of any well-known general purpose variety with the above-described attributes, but in particular may be a Digital Equipment Corporation (DEC) Model PDP–9 computer. With this particular choice for local computer 30, it is convenient to also provide a so-called Extended Arithmetic Element (EAE), a Direct Memory Access Channel Multiplexor, and an Automatic Priority Interrupt (API) system, all standard hardware packages associated with the Model PDP–9 and manufactured by Digital Equipment Corporation.

Display processor 140 has "cycle stealing" access to the memory through memory multiplexor 134, and has memory access priority over the local computer processor 131. Cycle stealing implies that graphical data is snatched by display processor 140 from memory 132 and supplied to CRT 142 between execution of instructions contained in other parts of memory 132. The display processor controls the CRT 142 which may conveniently take the form of a DEC Type 343 Slave CRT Display.

The method of picture formation on the CRT display is point plotting on a 1024 x 1024 raster, i.e., lines and characters are formed from closely spaced points. Thus, according to the embodiment of the present invention being described, the display is classed as a dot or point scope as opposed to a stroke vector scope, in which lines are swept out. As will be clear from the description below, obvious modifications can be made to accommodate other than point-plotting display units.

The overall cooperation of the graphical display console 120 and the central computer 101 will now be described.

The central computer 101 and local computer 130 each contain equivalent, though not necessarily identical, structural data bases describing a problem. Central computer 101 may, of course, contain data bases corresponding to one or more other local consoles connected to computer 101 by modems 192–195. Greater precision in the storage of numbers and different linking conventions are advantageously used at the central computer. Local console memory space is at a premium, so some information condensation is usually considered necessary.

A user starts a problem by calling for the problem-describing data, and programs to deal with this data, to be loaded from the central computer memory 103 into the console local memory 132. Of course, if a problem is being formulated, little or no initial information may exist at the central computer. The user then employs the console input devices and whatever programs and data are available from central computer 101 to construct and initially work on his problem. Through an interrupt-centered monitor, the console computer acts on signals received from the input devices to direct control to appropriate servicing programs and/or apparatus. These programs and apparatus perform most manipulations on the locally-stored data quickly, i.e., in real time. The display processor, under control of the console computer, continually displays the appropriate problem information so that a user has rapid visual feedback of his actions.

A history of console actions and changes is accumulated at local console 120 and transmitted to the central computer where the manipulations specified by the history are also executed on the central data base. Because the user has received quick responses due to the actions of the console computer 130, the time demands for updating the central data base are not stringent. A task which cannot be executed at the console 120 because of local hardware/software limitations is directed to the central computer 101. The results of central machine computation are transmitted to the console for display and/or further work.

The main graphical data base is in the large central computer, but the local graphical terminal stores picture information in an identically structured form. As will be seen, information in the graphic data structure is conveniently stored in discrete "blocks" that are linked together by chains of "pointers." Although formats within blocks in the central computer are conveniently different from those in the local computer, there is a one-to-one correspondence between blocks in the two structures. Because the memory in the local console 120 is usually relatively small (typically 8,196 18-bit words), all blocks in the data base are not always present in local computer 130 at a given time. A dynamic memory management system fetches blocks from the central computer 101 when they are needed, and releases memory in local graphical console 120 to free storage when blocks are no longer needed. It should be kept in mind that information stored in local computer memory 132 may be of at least two types: the structured graphical data, and the programs for operating on this data, for fetching new data from control computer 101 and performing other non-display operations.

The following discussion describes the graphical data structure in the central computer 101; differences between block formats in the central machine and in the local computer are described at the end of the section.

GRAPHICAL DATA STRUCTURE

All graphical information is stored in both the central and local memories in highly efficient structured form. Typically, in accordance with accepted computer design practice, the organization of memories 103 and 132 dictates that such storage be in the form of data words, or sequences of data signals in the form of voltage levels, magnetization states, etc. The structural relationships between groups of such data words will first be described; a detailed description of individual words will then follow.

Graphical data is stored in "blocks" of data words corresponding in part to the elements of a directed graph. That is, some blocks correspond to graphical "nodes" and some to graphical "branches." In addition, blocks are assigned to nondisplayable, but nevertheless important, graphical information. These blocks are referred to as node blocks, branch blocks and data blocks, respectively. Certain node blocks are of sufficient importance to warrant a separate name, leaf blocks.

Only leaves and their corresponding leaf blocks represent displayable information. For example, a leaf block may contain the information necessary to specify to the interpretive portions of the system an electrical circuit element such as a resistor. Upon presentation of a leaf block containing this information, the system under consideration will, if desired, display a visible representation of the circuit element, i.e., the circuit schematic symbol, on CRT 142.

Aside from the leaf blocks, all graphical data blocks serve to indicate structural relationships between portions of displayable material or otherwise characterize such portions. Node blocks (other than leaf blocks) and branch blocks are of fixed size while other blocks may be of arbitrary extent.

Figure 2:
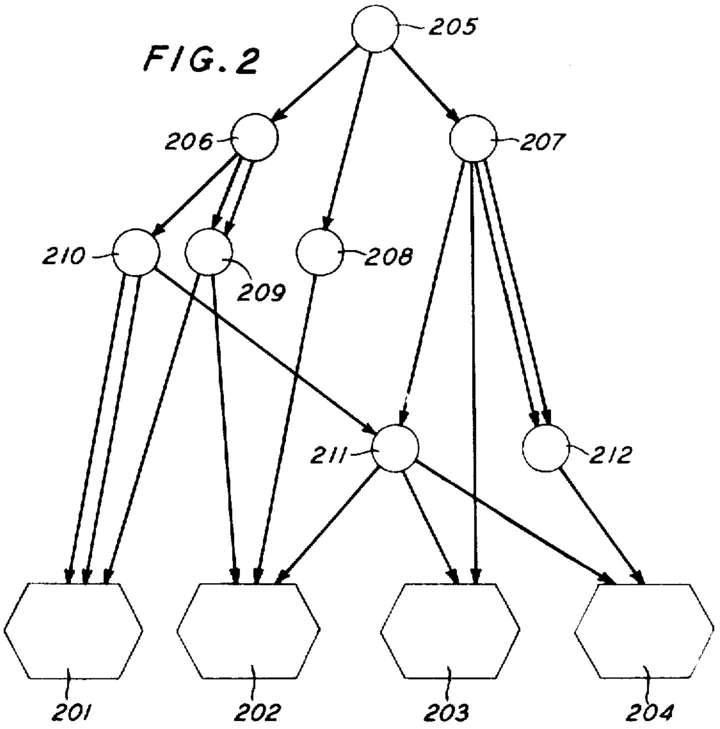
FIG. 2 is a representation of a typical data structure according to the present invention.

FIG. 2 shows a representation of a typical data structure. There, the hexagonal elements 201–204 represent leaf blocks, the circles 205–212 represent node blocks and the connecting arrows represent branch blocks.

Each node block represents a particular sub-part of the picture. Each branch block represents a particular occurrence, or instance, of the node to which it points. A branch block may be thought of as a graphical call to a sub-part of a picture. It causes the sub-part corresponding to the node to which it points to appear at a position specified by information in the branch. As can be readily appreciated, a picture part can be readily moved about the screen of CRT 142 in accordance with this structure, by merely changing the position information contained in the branch. Node blocks serve to group together those sub-parts that the user may want to be associated with each other to form a larger sub-part. This nesting can continue to arbitrary depth. A picture sub-part may, therefore, be as simple as a single point, or may include a large collection of smaller sub-parts which contain still other sub-parts, and so on. Ultimately, the entire picture is considered as a special case of a sub-part. Thus, an entire picture corresponds to a single node. Several such entire-picture nodes may be stored in the respective memories 103 and 132 at any given time.

An important advantage of the data structure according to the present invention is that picture sub-parts can be combined to form larger sub-parts as desired, by merely specifying a new node having branches leading to the original sub-parts. In particular, two entire picture nodes can be subordinated to a higher level node corresponding to a new entire picture.

It is possible, of course, for many more entire-picture nodes to be stored in the larger memory of central computer 101 than in the relatively smaller local computer memory 132. Because of the memory management system described below, however, the local computer 130 is provided with a large virtual memory limited only by the size of memory facilities at the central computer.

In the following discussion, in reliance on the analogy to a directed graph, and to simplify the discussion, graphical information blocks will be identified as, for example, "nodes" instead of "node blocks," when no confusion will result.

Before proceeding to a detailed description of the individual kinds of blocks, a brief discussion of the concept of a "ring," as used in the present context, appears to be in order. This concept has previously been described by L. G. Roberts, "Graphical Communication and Control Languages," Proc. Information Systems Sciences Second Congress, 1964, pp. 211–217.

Briefly, a ring is a sequence of pointers, or data words (or parts of words) which link together portions of a graphical structure by specifying the location of successive portions of the graphical structure. Typically, one or more pointers are provided in each graphical element, e.g., a branch block, which point to other graphical elements, e.g., another branch block. A closed sequence of these pointers, with the last pointing to the block containing the first, constitutes the ring. Thus, for example, in the case of branch rings, a sequence of pointers (one in each branch) identifies in order the complete set of branches directed toward a given node without having to provide a list with the node. Other, similar, rings with functions that will be clear from the context will be described below.

A fixed-size (non-leaf) node block comprises words:

(A) Identifying the type of block (a node).

(B) Pointing to a name data block associated with the picture subpart corresponding to the node. If no name has been specified, this pointer will have the null value.

(C) Pointing to the first branch in the "in-branch" ring.

(D) Pointing to the last branch in the "in-branch" ring.

(E) Pointing to the first branch in the "out-branch" ring.

(F) Pointing to the last branch in the "out-branch" ring.

As illustrated in FIG. 2 an arbitrary number of branches may enter a node, and an arbitrary number of branches may leave. It would not be possible to allocate a fixed size node block if pointers to all branches were required in the node block. To avoid this problem, the "in-branches" (branches entering the node) and "out-branches" (branches leaving the node) are organized in separate rings. The node block contains a pointer to the first branch in each of these rings, this first branch contains a pointer to the second branch, and so forth. Finally, the last branch contains a pointer back to the original node. A second, paired, version of both the "in-branch" and "out-branch" rings is established by a sequence of "back-pointers" which links all the elements in the rings in reverse order to permit more rapid tracing through rings.

Each branch block represented in FIG. 2 by an arrow has two pairs of rings associated with it: the "out-branch" ring pair corresponding to the node the branch starts on, and the "in-branch" ring pair corresponding to the node the branch terminates on. As in the case of node blocks, each branch contains a block identifier word or sequence of binary signals (identifying it as a branch) and a pointer word to a data block that contains its symbolic name. Thus every branch, and therefore every occurrence of a picture subpart in a picture may be referred to symbolically. If the branch has not been assigned a name, this data block pointer contains a null value.

The branch also contains elements of the two rings associated with it, each of which contains:

(A) A pointer in a forward chain linking all branches in the ring.

(B) A pointer in a backward chain linking all branches in the ring.

(C) A pointer to the node that is the "head" of this ring.

These pointers facilitate rapid examination of the structure under program control.

Two pointers leading to data blocks are also included in each branch block. These are the "system nondisplay data" pointer and the "user nondisplay data" pointer. If either of these pointers is not being used, a null pointer (such as a sequence of all "0" binary signals) is used for it. The system nondisplay data pointer and any data blocks linked to it are for the exclusive use of the graphical programming system-user programs may not access this information. The principal use of the system pointer is to point to a data block, typically one that identifies the branch as a light button. In that typical case the data block contains the name of a program entry point that control is to be passed to if the instance represented by the branch is pointed at by a light pen.

The purpose of the user nondisplay pointer is to allow the user to attach nondisplay information to the graphic data structure. This nondisplay information is placed in "data-blocks," which are one of the four types of blocks found in the graphical data structure. These data-blocks are for the exclusive use of the user. They are defined and allocated under program control and may be of arbitrary format and size. They are intended to allow the user to specify information about instances or node occurrences, which information does not appear in the display. Again referring to our circuit design application for the console, such a data block might, for example contain the value of a resistor or the like.

Finally, the branch contains three fields (words or portions of words) necessary for the generation of the display itself. The X and Y displacement signals contained therein specify the distance between the display origins of the nodes (or node and leaf) which the branch joins. Since, according to one embodiment of the present invention, all display information in the structure is in terms of relative coordinate information (only the starting point of a display is an absolute coordinate in this embodiment), instances of subpictures can be moved about the display surface simply by changing the X and Y displacements in the proper branch. The last field contains display parameter information. Such things as intensity, scale and information as to whether or not the light pen is to be enabled during the display of the instance can be specified. More will be said about these displacement, parameter and other fields below.

Leaf blocks specify how portions of a picture are actually to be drawn. They specify the "ink" that is visible in a portion of a picture. Data is placed in leaves by calls to data generating apparatus and subroutines in response to input signals from the various input sources, including stored data signals from the local and central computers. Both text and line drawing information may be specified.

When information is placed in leaves, the user/programmer is specifying information on a very large display surface. It is only when the information is finally displayed on the CRT that a "window" is established that specifies what portion of the display is to be visible on the output device. Data "grown" into leaves in real time by drawing on the local console scope may be rescaled by changing parameters in the graphical data words before they are stored in the central data structure.

Since a leaf may contain an arbitrary amount of data, its size cannot be specified in advance. For this reason, the leaf is conveniently broken into sub-blocks of two types: a leaf-header sub-block, and leaf-data sub-blocks. The leaf-header sub-block contains a single ring-element, the "in-branch" ring, since by convention no branches point away from a leaf. It also contains a pointer to the first leaf-data sub-block and to the last leaf-data sub-block that make up the body of the leaf. These leaf-data sub-blocks are themselves linked by a chain of pointers. A new leaf-data sub-block is allocated and added to the chain whenever new data for a leaf is generated.

Figure 3A:
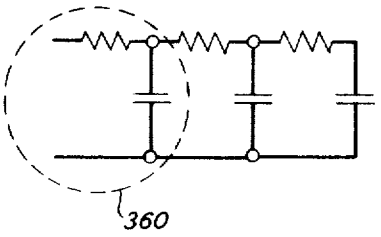
FIG. 3A shows a typical graphical image which can be displayed by the present invention.

A brief example will now be presented to illustrate the correspondence between a picture to be displayed and the structured graphic data representing the picture in accordance with one embodiment of the present invention. FIG. 3A shows a schematic representation of a simple electrical circuit; it is this schematic segment that is to be displayed on CRT 142 shown in FIG. 1.

Figure 3B:
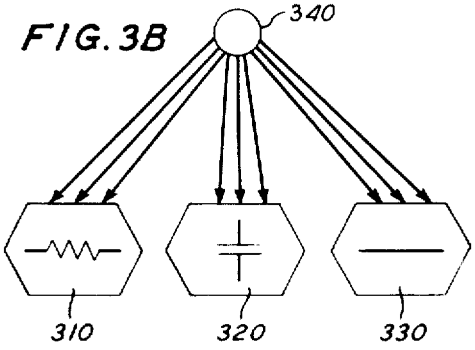
FIG. 3B shows one way to structure the graphical information corresponding to the image shown in FIG. 3A.
Figure 3C:
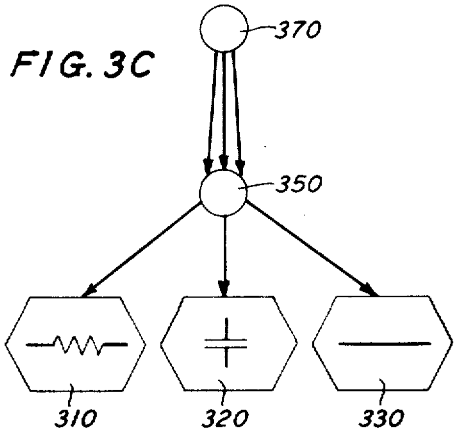
FIG. 3C shows one alternative way to structure the graphical information corresponding to the image shown in FIG. 3A.

Leaf blocks are generated containing the picture data corresponding to each of the three types of elements in the circuit of FIG. 3A. The blocks corresponding to the resistors, capacitors and short-circuits are shown in FIGS. 3B and 3C as 310, 320 and 330 respectively. The visible information corresponding to data in these leaf blocks is positioned on CRT 142 as desired by supplying the necessary branch blocks. In all cases the data are supplied to CRT 142 by way of display processor 140 in the form of a sequence of data words.

Actual construction of the leaves may be accomplished by drawing lines on the screen of the CRT with a light pen, or by other means. A resistor, for example, can be represented by a number of connected vectors drawn by hand using the light pen. Alternatively, these vectors are specified by a sequence of instructions entered by one of the other input devices. These instructions are in turn interpreted by programming or apparatus within local console 120 or central computer 101 to produce the sequence of required display commands.

FIG. 3B shows one way of structuring the data needed to represent the circuit of FIG. 3A. Here a two-level structure is used. The most elementary level comprises the leaf blocks 310, 320 and 330 themselves; the only other level is the total picture level represented by picture node 340. Thus a picture of the circuit of FIG. 3A can be displayed by calling for block 340 to be read from memory 132 to display processor 140 in FIG. 1. Central processor 131 will then recognize that block 340 is not a leaf block and will therefore search for the individual occurrences of the lower level nodes, here the leaf nodes corresponding to the circuit elements in the picture. Central processor 131 will then call for the individual commands of the circuit-element leaf blocks to be read in sequence from memory 132 as they are needed. Each branch block shown in FIG. 3B as an arrow represents a particular occurrence of the leaf block at the head of the arrow. That is, just as there are 3 resistors in FIG. 3A, so are there 3 branches leading to leaf block 310. The individual commands in this leaf will therefore be read (nondestructively) from memory 132 on 3 separate occasions in generating a single frame of the picture associated with node 340. The entire picture will, of course, be refreshed at a rate sufficient to prevent flickering of the viewed image. Thus the sequence of resistor leaf instructions, for example will be read from memory 132 at a rate of approximately 90 times per second.

FIG. 3C illustrates an alternate structuring of graphic data to represent the picture in FIG. 3A. An additional level of structure has been included here and is shown as node block 350. This node block describes a subpicture corresponding to that (repeated) part of FIG. 3A shown encircled and identified as 360.

A picture is generated using the structure of FIG. 3C by interpretively procesing block 370, which represents the entire picture. This processing is again initially performed by central processor 131 which, upon recognizing each instance of node block 350 (corresponding to subpicture 360), and detecting that block 350 is not a leaf block, proceeds to trace through the structure to lower level nodes. Pointers associated with node block 350 identifying the single instance of each leaf block are then detected and appropriate calls are generated for these leaf blocks to be read by display processor 140. The individual display commands contained in the leaf blocks are then sequentially read by processor 140 from memory 132. This alternate organization, though increasing the number of node blocks by 1, decreases the number of branch blocks. In complex picture situations such increased structuring often results in decreased storage requirements and simplified processing.

Additional nondisplay data blocks are linked to these branches in most applications. They contain such information as the electrical type of the elements being displayed and their parameter values for use by analysis programs at both the local and central computers.

The data structure at local console 120 retains all the structural information present in the data structure in central computer 101. Local computer 130 uses structure information because of the processing efficiencies and consequent real time response it provides to users at the local console. It is able to identify objects that are pointed at without requiring referral to, or intervention by the central computer. Local computer 130 is able to edit the structure, too.

The local data structure contains nodes, branches, leaves and data blocks that are conveniently in one-to-one correspondence with equivalent blocks in the central data base. Formats internal to these blocks at the local computer are different, however, from the corresponding blocks at the central computer in several respects.

First, leaves in the local console contain display commands in a format (described below) required to run the display scope, while picture information in the central computer is represented in a device independent way. This latter characteristic is useful because with it other display terminals not having an interactive capability may employ the centrally-stored data to provide an output-only indication, for example. Because a different dynamic storage allocation technique is advantageously used in the local console, a leaf is conveniently arranged to be a single contiguous block of memoy rather than a sequence of leaf-data blocks linked to a leaf-header. These leaves can be grown in real time under program control and may be of arbitrary length.

Because space is limited in the small local computer, an abbreviated pointer system is often used to link blocks in the data structure. In particular, back pointers and pointers to the heads of rings are often not used. Tracing a path through the structure, therefore, may require more time, but time is a resource that is more readily available at the local terminal than is space.

CONSOLE HARDWARE

The local central processor 131 in FIG. 1 acts in response to interrupt signals generated by local input devices or by the central computer 101. These signals, and data signals accompanying them, activate programs in the shared local memory 132. In executing these programs, words are accessed from memory 132, and temporarily stored in the central processor 131. There, the operation code and arguments are interpreted, and the appropriate action (such as an add, shift, accumulator load or store, device control, etc.) is performed. The display processor 140 also accesses words directly from memory 132, interprets the operation code and arguments, and performs the appropriate display action. For the display processor these actions include drawing points, lines, and characters on the console CRT 142.

Figure 4:
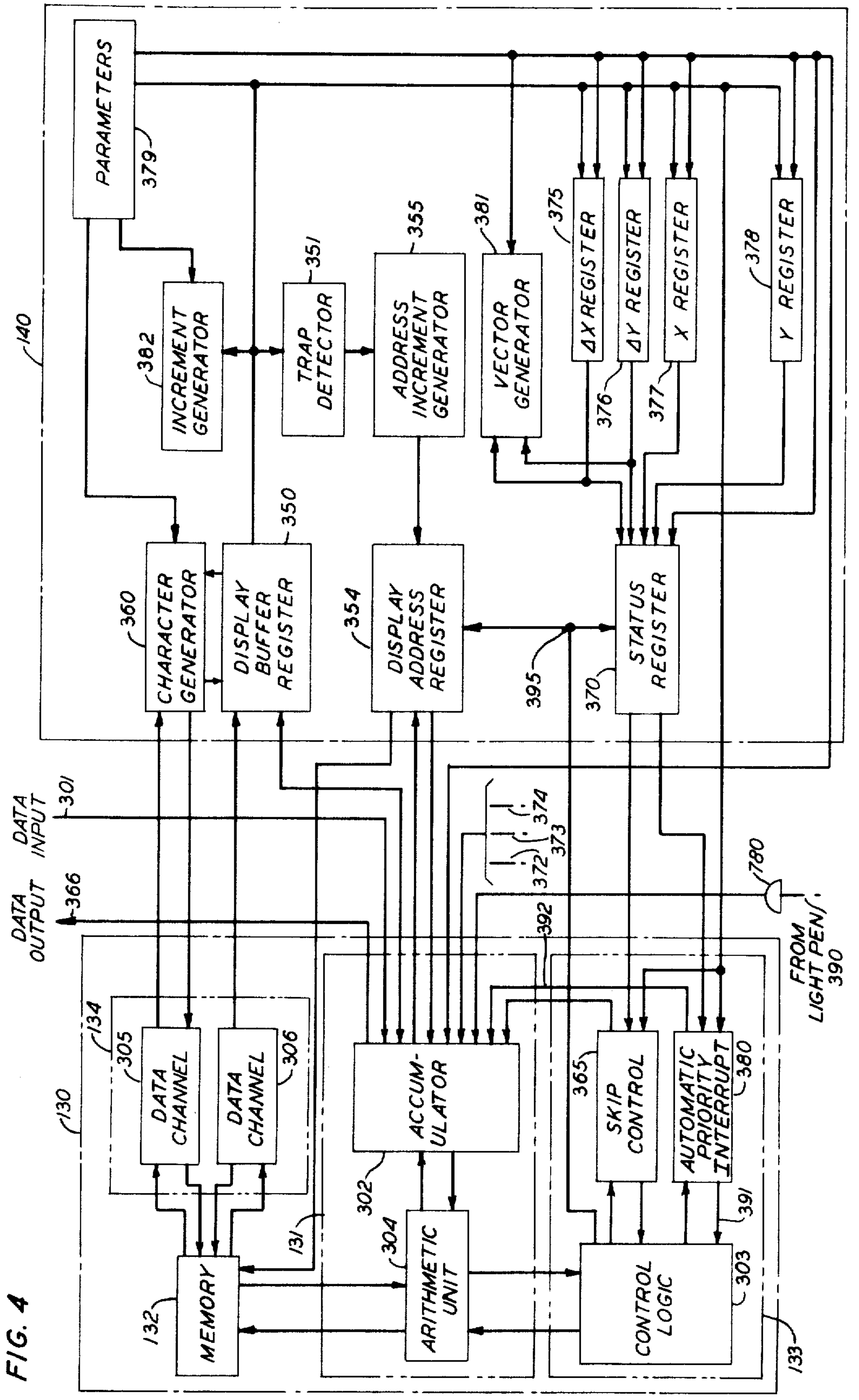
FIG. 4 shows a block diagram of certain portions of a graphical console according to the present invention.

The console computer 130 and display processor 140 can operate independently of one another. However, local central processor 131 has control over the display, in that it can initialize, start and stop the display processor. FIG. 4 shows a more detailed block diagram of certain elements of FIG. 1 in accordance with one embodiment of the present invention.

FIG. 4 shows in greater detail the apparatus for interacting between local computer 130 and display processor 140 in FIG. 1. In particular, central processor 131 is seen to comprise an accumulator 302 and an arithmetic unit 304. Accumulator 302 acts as the focal point for a considerable part of the interaction between the local computer and the display processor. Another element of local computer 130 shown in FIG. 4 is memory multiplexor 134 which is seen to include data channels 305 and 306. Other parts of local computer 130 include the various elements of controller 133. In particular block 303 represents control logic whose function will be described in greater detail below.

Automatic Priority Interrupt (API) 380 shown in FIG. 4 provides an indication on an output lead whenever a programmed interrupt is encountered or whenever one of the several input devices, including the central computer 101, supplies an appropriate interrupt signal. API 380 examines this input signal and directs a transfer to appropriate processing programs or circuits.

Thus, for example, a pulse generated at a light pen and appearing on lead 390 provides an indication at central processor 131 by setting a flag in API 380. API 380 then interprets the interrupt signal and provides an output signal on lead 391 which is directed to control logic 303. Control logic 303 then directs control to the appropriate program or apparatus needed to process the input signal, e.g., the light pen signal.

While the illustrative interrupt signal is shown in FIG. 4 to pass by way of control logic 303, the signal will in some embodiments of the present invention circumvent control logic 303 by directly entering a code into accumulator 302 by way of lead 392. This signal may then direct a transfer of program control within local computer 130 or may, after transfer to display address register 354 (described below), cause an appropriate deflection, character generation, etc., by specifying corresponding graphical data to be read from memory 132.

An additional interrupt technique may be used instead of or in addition to that described above. According to this variation, interrupt indications are supplied to skip control 365 via a flag uniquely associated with the particular source of interrupt. This flag may take the form of a flip-flop in control logic 303 or may be a portion of a word stored in memory 132. Skip control 365 then systematically scans the possible flag positions to identify the set flag and direct transfer of control accordingly.

Typically, in accordance with one embodiment of the present invention employing skip control 365, a flag test is contained in the first of a sequence of instructions stored in memory 132 and associated with a particular source or type of interrupt signals. When the result of this flag test is negative, an immediately following instruction directs transfer to the first instruction in another sequence, and so on. When the initial test instruction of a sequence identifies a set flag, the immediately following instruction (which would have directed a transfer to another sequence) is skipped, the interrupt indication in skip control 365 reset, and the remaining instructions in the sequence executed by local processor 131. In other aspects, the operation and effect of skip control 365 and API 380 are equivalent.

Several important registers contained in display processor 140 are also shown in FIG. 4. Display buffer register 350 is connected via data channel 306 to the local computer memory 132. The path through these major elements comprises the route followed by most graphical structured data stored in memory 132. Associated with display buffer register 350 is a trap detector 351 whose function will be described in greater detail below. Display buffer 350 is also connected to local computer 130 by way of path 352 which originates at accumulator 302.

Also connected to accumulator 302 is display address register 354. This register indicates the address from which graphical data is to be obtained from memory 132. Address increment generator 355 generates a signal to increment the address indication stored in register 354. These signals may be inhibited in appropriate cases by signals originating at trap detector 351.

FIG. 4 also shows character generator 360 connected via data channel 305 to memory 132. Character generator 360 serves to generate the many commonly-occurring graphical functions such as alphanumeric symbols. This character generation function is seen below to be complemented by character generation facilities involving arithmetic unit 304 in local central processor 131. In appropriate cases character generator 360 is activated by signals passing from memory 132 by way of data channel 306 and display buffer register 350.

Another important register shown in FIG. 4 is the status register 370. Various of the control functions performed by controller 133 and arithmetic unit 304 under program supervision are conditioned by the state of status register 370.

Typical input facilities are also shown in FIG. 4 as part of display processor 140. In particular, console key board 372, push-button inputs 373 and light buttons 374 are shown to provide input information to accumulator 302 in a manner similar to that described by Minke, supra. In addition, light buttons 374 are able to operate as output indicators responsive to signals originating at accumulator 302.

Finally, a sequence of 5 registers contained in display processor 140 and associated directly with display CRT 142 are also shown in FIG. 4. These are the $\Delta x$, $\Delta y$, $x$, $y$ and parameter registers which supply information to the CRT in a form to be described below. These registers are identified by numerals 375 through 379 respectively.

Typical operations performed by the local console will now be described with reference to FIG. 4. The method of operation involving the initializing and starting up of the display console and the normal interactive sequencing of graphical data will each be described in turn.

Initializing and starting is accomplished by loading the local computer accumulator 302 with the memory address at which the display should start. This information is entered from the console input devices or by direction from the central computer 101. Control signals from control logic 303 causes this information to be transferred to display address register 304 in the display processor 140 when the latter is ready; this starts the display cycling.

Under internal controls, the display processor uses the display address register 354 to access display words from the shared memory 132. Each word accessed is transferred to display buffer register 350 and thence to appropriate registers 375–9. As each word is executed, the display address register 354 is incremented by incerment generator 355 and the next word is fetched. Thus, the display address register 354 performs the function of the program counter in a normal computer. The execution of sequential words from memory is continued until specially coded words (display trap words) stop the cycling and signal the local computer. Further aspects of this trap or interrupt technique will be discussed below.

As mentioned above, there are two principal data channels from the shared memory 132 to display buffer register 350. It is the path from memory 132 via data channel 306 to display buffer register 350 which is normally used for cycling temporary static graphical information. The other path that leads directly from accumulator 302 to display buffer register 350 is used principally for special character or function generation.

The same form of code instructions which are supplied to memory 132 are used in the accumulator-display buffer path. However, unlike the path through data channel 306, the accumulator path is under single step control, i.e., a signal is passed back from display processor 140 when each accumulator-provided word has been completely executed. When this latter signal is received by local computer 130, a new word, which has in the meantime been loaded into the accumulator, is then executed. While such step-by-step operations are being performed no change is made in the display address register 354. This allows normal recirculating display information to be resumed at precisely the point at which it had been discontinued to allow for accumulator-display buffer interaction.

The accumulator-display buffer data path is useful in setting and restoring display status in addition to performing a function generation mentioned above. Typically, the function generation is commenced after a display trap word has been detected in the processor 140. A separate trap detector, shown as 351 in FIG. 4, may be provided, or this function may be performed by control circuit 133. In either event, the count shown on display address register is frozen by inhibiting increment generator 355. This trap word, in addition to stopping normal recirculation of display data, also supplies function generation arguments by way of control circuit 133. Upon completion of a function generation activity, normal display cycling is resumed, i.e., the path from 132 into data channel 306 then becomes operative.

The use of this two-path interaction between the programmed local computer 130 and display processor 140 provides greater flexibility and more prompt response than earlier single-path display consoles.

In adition to the two principal data paths between local computer 130 and display processor 140 there is an additional data path through controller 133 for conveying status information from status register 370 back to central processor 131. This status information includes display parameters, $x$ and $y$ coordinates, vector coordinates, current scope word and various scope flags.

In addition to the data paths, there are control paths between local computer 130 and display processor 140. One of the control paths to the display processor from controller 133, shown as 395 in FIG. 4, is used to initialize, start and stop the display cycling, and to control the display status loading back to the accumulator. The stoppage of the display processor using this path can be either graceful or ungraceful. By graceful is meant that the status of the display processor can be completely stored for restoration at a later time. This ability is especially helpful when employing light pen tracking. An ungraceful stop gives no consideration to status saving; vectors or characters are abandoned in mid-generation. This type of stop is useful when switching displays or making sure that the display processor is stopped before initiating a new display. A control path to local computer 130 previously described is connected to automatic priority interrupt 380 and signals various display conditions, particularly display traps.

It is important to be able to manipulate and display structured information locally. One feature of the present invention which contributes strongly to this ability is a technique which allows a structure to be displayed directly without mapping into a special display list as in many prior art systems, and which allows a hierarchical list of data currently being displayed to be dynamically maintained.

This is accomplished through the intimate cooperation of the central processor 131 and the display processor 140. The display processor performs only the fundamental display operations such as drawing points, lines, curves, and setting display parameters. The instructions corresponding to this set of operations is referred to as a set of display "primitives." Control computer 130 is called upon through directed faults (display trap words) to perform transfer-of-control operations (direct and subroutining transfers), real-time function generation, structure tracing dictated by the graphical data structure described above, and processing of other real-time programs.

Using the processor to help in running the display reduces the complexity and cost of the display processor electronics, allows a data structure to be displayed directly and allows a push down stack of display structure level to be maintained dynamically so that light pen strikes are easily serviced. In order to see how this is accomplised, let us examine the detailed display operation codes.

DISPLAY OPERATION CODES

Typical display processor codes are shown in FIG. 5. Programming difficulties have been encountered in previous interactive graphic consoles because two modes of interpretation of display words have been remitted, i.e., one bit configuration has been used to represent two different things, depending on the scope mode. These difficulties have been effectively avoided by designing the display code set with a separate operation code in each word. Thus, one can tell by merely examining a single word what operation it will perform.

The leading bit (reading from left-to-right) in a display word, if a "0," categorizes the word as a display primitive. All bit positions are numbered consecutively from left to right in the various parts of FIG. 5. The primitives control the setting of display parameters, and the plotting of points, lines, and characters. We will now examine the primitives in detail. These and other codes are described with reference to a standard 18-bit word which is dictated by a particular choice for the local computer. It will be readily understood that no such choice is fundamental or essential to the present invention, but merely represents an easily-modified design decision.

The format of the first primitive shown in FIG. 5A controls the plotting of characters, utilizing a dot matrix. According to one embodiment of the present invention a character generator such as the D.E.C. Type 342 character generator is used. This generator is capable of generating signals representative of the 95 printing graphics of the proposed revised ASCII code on a basic 5 x 7 grid. The signals produced by character generator 360 are the sequence of voltages to be applied to the deflection and intensity inputs of CRT 142.

In another embodiment of the present invention which provides a high degree of flexibility in composition, local computer memory 132 is used to store a character font. Typically, rather than specifying points on a fixed grid, 7-bit character codes are combined with a pointer word to address a dispatch table in the computer memory. The dispatch address is then used to access increment mode-like words from the computer memory which describe the character. Data channel 306 of the direct memory access multiplexor 134 shown in FIG. 4 is employed in this latter implementation. Double-word buffering provided by buffer register 350 is used to eliminate memory access waiting time overhead.

Other methods of character generation can, of course, be used with the present invention. In particular, data supplied by character words of the type shown in FIG. 5A may be used to activate character generators described in Poole, Fundamentals of Display Systems, Spartan Books, Washington, 1966, chapter 9.

The format for a parameter word is shown in FIG. 5B. These words are used to establish the intensity, scale, and symmetry transformation of display material. It also determines whether the light pen should sense the displayed material and whether the material should blink (on-off rate of approximately 1 Hz.). A parameter word is uniquely identified as such by the first 4 bits, viz, 0001.

The above-mentioned symmetry transformation is one for modifying the interpretation of other data words to facilitate manipulation, especially rotation, of the visible display. Such transformation of data often reduces the amount of data which need be stored by providing for multiple interpretation of a single stored word or sequence of words. Typical useful applications of such transformations include those described in, or obvious in light of, copending U.S. patent application by M. V. Mathews and H. S. McDonald, entitled "Generation of Graphic Arts Images," Ser. No. 498,018, filed Oct. 19, 1965 and assigned to the assignee of the present application. The method of operation of the symmetry transformation will now be described.

Outputs from vector generator 381, character generator 360, and increment generator 382 shown in FIG. 4 produce up, down, right and left movement commands. The first bit, identified as E in FIG. 5B, indicates exchange, and controls the exchange of axis. If E is set, a right command becomes an up command, a left command becomes a down command, and vice versa. The $C_x$ bit indicates a complementing of the sign of $x$; if set it makes a right command into a left command and vice versa. The $C_y$ bit indicates a complementing of the sign of $y$ and performs analogous functions to the $C_x$ bit. Any combination of exchanging and complementing can be used to produce any of the 8 symmetries of a square. In accordance with the transformation, exchanging is performed before complementing of sign.

The condition or command bits in the parameter word shown in FIG. 5B indicate whether the corresponding current parameter value is changed or remains the same, as indicated by a "1" or "0," respectively. This conditioning feature applies in this form to the blinking, light-pen enable, scale factor, and intensity parameters. For the symmetry transformation parameter, a "1" in the conditioning bit functions as for the other parameters. A "0" conditioning bit in the symmetry parameter, however, means that the indicated symmetry setting is added on to the current value to form a new accumulated symmetry setting. If a +90° rotation is already indicated, an accumulated 180° rotation produces a +270 setting. This cumulative symmetry parameter setting is especially well adapted for nested graphical subroutines.

The actual means by which the transformation is effected will, of course, depend on the detailed operation of the various generators 360, 381 and 382 that are used. According to well-known character, vector and increment generation methods, including those described in Poole, supra, a single bit or a simple combination of bits of information stored in a flip-flop, for example, are sufficient to specify the orientation of a vector, character, etc.

Thus, the present invention, in one illustrative embodiment shown in FIG. 6, provides for the selective setting or resetting of these flip-flops in accordance with the symmetry parameter value. Registers 710, 720, 730 and 740 are used to store the command, E, $C_x$ and $C_y$ parameter bits respectively. These registers may actually be part of parameter register 379 shown in FIG. 4, or may be separately provided. The output signals from these registers are combined by rotation indicator 760 acting under control of sequencer 750 to provide the required set-reset signals indicated above on leads 775–7. In one simple version, sequencer 750 is a ring counter or similar recirculating or scanning device, and rotation indicator 760 a set of 3 gates sequentially enabled by the sequencer signals.

When the command bit corresponding to the symmetry transformation in a parameter word, and stored in register 710, is a "0," the rotation specified by the bits in registers 720, 730 and 740 is combined in a strightforward manner by rotation indicator 760 with an indication of a previously accumulated rotation stored in cumulative rotation store 770. Concurrent with or subsequent to generation of signals representing a new cumulative rotation by rotation indicator 760, and delivery of these signals on leads 775–7, cumulative rotation store 770 is updated by signals on lead 778. Conveniently, cumulative rotation store 770 contains binary counters which may be advanced by pulses on lead 778.

The light-pen-enable (ON-OFF) bit in a parameter word is conveniently arranged to appropriately enable AND gate 780 shown in FIG. 4 which is used to condition signals received by accumulator 302 from the light pen on lead 390.

Similar enabling or conditioning signals are generated in a straightforward manner in response to the condition of scale and intensity bits in a parameter word. These signals typically cause a shift in position of data within a vector generator register, thereby effecting an expansion or contraction of a vector or character. Alternately, and especially when increment mode signals are used, these signals cause a reweighting of incrementing or decrementing signals applied to $x$ and $y$ registers to effect an expansion or contraction. For absolute vectors or characters, the time base is conveniently modified or the slopes of waveforms altered. Intensity bits, after being converted into corresponding analog voltages in some cases, typically modulate a bias on well-known intensity control circuits associated with CRT 142 shown in FIG. 1.

Provision is made in the set of display primitives for words specifying vector generator parameters. The format for two forms of such words is shown in FIGS. 5C and 5E and will now be discussed.

For ease in status saving and restoring, each display word was made independent of any others. Two-word instructions and enforced order in two-word groups were avoided. Thus, a single long vector word, the format of which is shown in FIG. 5C, supplies sufficient information to direct the drawing of a line in a coordinate direction, i.e., to draw a horizontal or vertical line. For an oblique line, two such words are required, but the order of giving the components is immaterial. This is because separate holding registers 375 and 376 are provided for $x$ and $y$ coordinate directions respectively to save vector components until they are used. In fact, if such made sense, a $\Delta x$ long vector word could be encountered and followed by parameter, $x$–$y$ character, and increment words before the $\Delta y$ vector component word is given. The vector is executed only when the vector generator receives the required pair of component-specifying signals.

In fact, several options are provided in the drawing of vectors. First of all, for a long vector word, the format of which is shown in FIG. 5C, the vector component holding register for the specified component is loaded only. No line is drawn. Second, the component holding register is loaded and the vector, as specified by the current contents of both component holding registers, is drawn without beam intensification. Both holding registers are cleared after vector execution. Third, operations of the previous option are executed except the beam is intensified. Finally, the operations of the second option are performed except only the last point of the vector is intensified. This last option gives a relative point feature. These options are directed by controlling CRT intensity control in accordance with the 2-bit sequence labeled "CONTROL" in FIG. 5C.

FIG. 7 illustrates apparatus in accordance with one embodiment of the present invention for controlling the various vector-execution options outlined above. Control 790 represents means for interpreting signals contained in the two control bits of a long relative vector word shown in FIG. 5C and for generating signals to enable or inhibit the various other circuits in FIG. 7. In appropriate cases, control 790 may merely represent a portion of display buffer register 350 or similar auxiliary storage. The signals generated by control 790 enable the load of $\Delta x$ and $\Delta y$ registers 375 and 376 when appropriate. The contents of these registers in turn control vector generator 381 which develops the necessary deflection voltages required by CRT 142. Additionally, control 790 provides signals enabling, in appropriate instances, intensity control circuit 550 which provides intensity signals to CRT 142.

The same options described above in connection with long vector words are available for each short vector word, the format of which is shown in FIG. 5E. Since each vector component is represented by a smaller number of bits than in a long vector word, both holding registers can be set simultaneously by the short vector word. The "load holding registers only" option becomes a null operation.

Absolute position words are used to set the $x$ and $y$ coordinate registers of the scope. The format for a typical absolute position word is shown in FIG. 5D. One bit position, shown here as bit position 6, is used to enable the intensification control associated with CRT 142 if a point is to be plotted. Another controls the settling delay, a "0" indicating no such delay and a "1" specifying that one occur. This latter bit is set to "1" for isolate $x$ or $y$ words or for the second word of a $(y, x)$ or $(x, y)$ pair.

Increment mode words shown in typical format in FIG. 5F contain two 7-bit increment bytes. These bits of each of these bytes are used to specify one of eight incremental movement directions, another single bit to determine whether the beam is to be intensified after a move, and the remaining 3 bits to specify the number of moves to be taken (0 through 7) in the specified direction, FIG. 5G shows one correspondence that may exit between the 3-bit direction sub-bytes and actual deflection changes. The members are the decimal equivalent of the 3-bit binary number. The increment mode is useful in special character generation application.

Typical control mode words, the format of which is shown in FIG. 5H, are useful for specifying stop and conditional stop conditions, among others. When the display processor encounters a control word having a "1" in bit position 5, for example, the display cycling is discontinued and a flag set. This flag signals the console computer through the interrupt system. If the conditional stop bit position, typically bit position 6 in a control word, contains a "1" signal and in addition a separate flag indicator, the conditional stop enable, is set, the system responds as it would if a "1" had appeared in the stop bit position. If the conditional stop enable is off, the conditional stop bit is ignored. Thus, the conditional stop can be used to mark places where the display cycling is to be stopped if program conditions so dictate. The remaining bits of the control word can be used for controlling slave displays if they are ever desired. Other such control words can be tailored to user needs by appropriate designation of the remaining control word bit positions.

If the leading bit of a display word is a "1," the word is according to one embodiment of the present invention interpreted as a display trap word. The display processor, upon encountering a display trap word, stops and signals the computer through the priority interrupt as described above. The second, third, and fourth bits of the display trap are typically used to specify which of eight transfer pointers is to be used to direct control to program. It should be understood that these eight trap pointers are in addition to any associated with input devices or, in some cases, input data from central computer 101.

Some of these programs then perform the commonly used transfer of control operations in the following ways. Direct transfers or jumps can be achieved by loading the display address register from the remaining bits of the display trap word or from the contents of a location in core storage and then restarting display cycling. Subroutine transfers can be accomplished by saving the display address register in a subroutine pushdown list, loading the subroutine address into the display address register, and restarting cycling. The subroutine address is typically contained in the remaining bits of the display trap word or alternately is stored in a specified location in memory 132.

An arbitrary amount of scope status can be transferred from status register 370 to memory 132 before cycling is restarted. Subroutine returns are then performed by restoring an arbitrary amount of status, loading the top entry in the subroutine pushdown list into the display address register, and then restarting cycling. Modifications to this trap-handling sequence are of course possible through changes in programs specified by the pointer portions of display trap words.

Aside from address manipulations, other display trap programs can be dedicated to on-line function generation using the accumulator path to the display prouessor. This technique was outlined earlier. Thus, for example, when a sequence of characters are being displayed using character generator 360, and a character is called for which is not in the repertoire of that generator, a display trap word may be used to point to a special character generating program in memory 132 which then constructs the required character on a step-by-step process.

Still other programs can be used to perform data structure manipulations every round in display regeneration cycle. Examples of this type of program are a "move" program to cause an object on the CRT to follow the light pen, and a "rubber band line" drawing program. Related interpretive techniques have preivously been described in copending U.S. patent application Ser. No. 510,305 by W. H. Ninke, filed Nov. 29, 1965, now abandoned in favor of continuation application Ser. No. 746,724 filed June 28, 1968, and assigned to the assignee of the present invention.

The ability provided by the display trap words to interpose console computer programs with display material is an important aspect of the present invention which allows a structure to be displayed directly and a push-down list of structure hierarchy to be maintained. The incorporation of display traps is another step in the continuing development of more powerful display techniques. These techniques began with displays being run from lists through the computer accumulator, moved to linear lists out of a channel, then to hardware subroutining, and now to intermixed programming.

The control hardware for each of the instruction classes is conveniently constructed as a separate module to allow for easier hardware maintenance. This arrangement also permits easier updating of the system as improved performance in vector or character generation is achieved.

EDGE VIOLATIONS

In a typical interactive session a graphical console user frequently causes picture pieces to be moved about the CRT screen. These pieces may remain totally on the screen. If appropriate, however, portions of a picture piece or the total piece should pass smoothly on and off the viewing surface. At times the graphical data will specify the illumination of a picture piece which is too large to be completely contained within the physical boundaries of the CRT. At other times the data will call for a picture part to fall partly on the CRT surface and partly beyond its boundaries. At still other times the data will specify points which are all beyond the physical boundaries of the CRT. These possibilities exist because a description of a very large (theoretically unlimited extent) piuture can be stored in the console memory 132, i.e., the number of digits used to specify a display point is arranged to be considerably larger than the number of digits necessary to specify a position on the physical screen. Thus, what is provided the user at any time is a "window" on this larger area specified by the totality of digits.

The user may want to move the actual viewing area smoothly about over the larger potential viewing surface. Frequently during such actions, there will be picture pieces which should be only partially displayed on the CRT. Thus, the moving of individual picture pieces about the screen, and the moving of a viewing "window" over a large problem surface, may both give rise to violations of the physical edges of the CRT.

Typical situations in which these edge violations arise are illustrated in FIG. 8. Shown there is a portion of the large potential viewing surface 850 with a set of rectangular coordinates superimposed on it, which coordinates are identified by the $+x$, $-x$, $+y$ *and* $-y$ axes. Also shown is an "origin-based" viewing window circumscribed by the $+x$ and $+y$ axes and the lines $x=x_0$ and $y=y_0$. This orgin-based window is the actual viewing window when the information to be viewed is specified by $x$ and $y$ position codes corresponding to values falling in the range $0\leq x<X_0$ and $0\leq Y<Y_0$. This positioning corresponds to placing the lower left hand (reference) corner of the viewing window at the absolute origin of the large viewing surface 850.

Typically, the points on the actual viewing surface of CRT 142 are specified on a 1024-by-1024 point grid. Thus, there are in this typical example $2^{10}$ possible $x$ coordinate positions and an equal number of $y$ coordinate positions. In a binary system, therefore, 10 digits suffice to specify the $x$ or $y$ coordinates of any point on the face of CRT 142. Additional higher order digits in an $x$ or $y$ coordinate specify points which are visible on CRT 142 only when the window is moved to a position more remote from the absolute origin $X=0$, $Y=0$.

To illustrate further, consider the typical display piece represented in FIG. 8 by a triangle within the above-identified (origin-based) window. Here the reference node for the window is located at the origin. This triangle can be generated by presenting a sequence of $x$ and $y$ coordinate signals to $x$ and $y$ registers 377 and 378 which then are processed by digital-to-analog converters and appropriate deflection circuits in accordance with any of several well-known techniques. This coordinate information can be generated indirectly by using vector generator 381, which need only be supplied with end point information; increment information is in the vector words described above; or beginning point direction, and length information in appropriate cases. Other more complicated display pieces can also be specified by such point-by-point information or by function generating arguments and associated function generators (including vector generators), or by a combination of these methods.

The triangle in the origin-based window is shown having a lower left hand vertex at coordinate position $(X_1,Y_1)$. As an example, this vertex may be identified by $X_1=Y_1=001010101010$. Identical triangles are easily specified having lower left hand vertices at positions $(X_1'=011010101010$, $Y_1=001010101010)$ or $(X_1''=101010101010$, $Y_1=001010101010)$ also shown (in dashed lines) in FIG. 8. These latter triangles can be viewed by moving the viewing window to include the points $(X_1', Y_1)$ or $X_1'', Y_1)$ and the remaining points on the respective triangles. Alternately, the points representing the triangles, including $(X_1'\ Y_1)$ and $(X_1'', Y_1)$ can be "moved" into the view of the origin-based window, typically to point $(X_1, Y_1)$.

If the triangle having its lower left hand vertex located at $(X_1, Y_1)$ or anywhere else on surface 850 be moved to a position where this vertex is located at $(X_2, Y_2)$ shown in FIG. 8, only that part of the triangle within the viewing window is displayed. Again it has been assumed that the viewing window had its reference node at the origin of surface 850; corresponding results obtain when the window is elsewhere.

It is important in a console, particularly in a satellite console, that such edge violations be easily and expeditiously handled. A separate display list and cropping program (and memory required for them), and the processing of the total data base for every minute movement is, of course, quite undesirable. Instead, edge violations should be handled dynamically as they occur.

The dynamic handling of physical edge violations is generally called "scissoring." The common approach to achieve scissoring is to represent picture parts by incrementally specified lines, points, and characters. Then, if these incremental movement commands cause a scope boundary to be crossed, the CRT beam is blanked until the boundary is crossed in the opposite direction at which time the picture again is on the screen.

An extra bit or extra bits in the $x$ and $y$ coordinate registers are used in the prior art to detect scope edge violations. In prior art stroke vector scopes, a total vector is not intensified if either end point is off the screen. Using this approach, to keep from having a ragged appearance at edges, vector lengths must be kept short. For dot generator scopes, dot intensification does not take place unless the extra bits in both coordinate registers are all zero. For the dot scopes, vectors can go off or come on the screen at intermediate points.

For the extra-bits scheme previously used, a picture "wraps around" (i.e., passes from the edge of the viewing surface being violated to the opposite edge as the violation occurs), when only the least significant bits of the coordinate registers are considered. The display is then intensified normally or is totally blanked under control of the extra bits. Overflows or underflows of the extra bits generate computer interrupts. Programs are then used to handle these special blanking situations.

The edge handling technique used in the present invention is distinguishable from these described techniques in several respects. Instead of using extra bits in the coordinate registers, a single-bit program-settable indicator determines whether the display is to be blanked, or whether normal beam intensification should take place. That is, only a single hardware flag need be provided instead of a large number of high-order bit registers and the associated hardware needed to load, clear and interpret their contents. The local computer 130 is signaled every time an edge is violated and determines the status of this *override* indicator before resuming the display.

An additional advantage of the edge violation techniques of the present invention is that the size of the potential viewing surface 850 in FIG. 8 is not limited by the size of the coordinate registers. By appropriate programming techniques any number of digits can be used to specify the location of a picture piece. The word formats shown in FIG. 5 are merely illustrative The previously-used techniques for handling edge violations require special programming to be present to handle the special cases of underflows or overflows of the extra-bit positions. The type of programming used in accordance with the present invention provides a consistent, symmetrical approach to the problem.

Before commencing a detailed discussion of the edge violation methods and apparatus, it will be well to review briefly the normal operation of the display apparatus itself. Referring to FIG. 9, we see a cathode ray tube 142 whose deflection is controlled most immediately by deflection yoke 501. Since according to an illustrative embodiment of the invention, graphical information is plotted on a point-by-point basis, each point is, typically, individually specified by data contained in $x$ register 377 and $y$ register 378 for the $x$ and $y$ coordinates respectively. The signals contained in these registers are transformed by digital to analog converters 510 and 520 into corresponding analog signals. These analog signals are subsequently amplified by horizontal deflection amplifier 530 and vertical deflection amplifier 540 deflect the electron beam in the CRT in the horizontal and vertical directions respectively. The beam is controlled in intensity by intensity control circuit 550 which is, in turn, responsive to appropriate bits stored in parameter register 379 and elsewhere as described above. An additional control of intensity is provided in accordance with the present invention in response to signals on lead 560; these signals will be described in more detail below.

FIG. 10 illustrates a simplified embodiment of the edge violation system according to the present invention. Shown there are display buffer register 350 and window reference register 605. The latter register is used to store information as to the desired location of the viewing window which may conveniently be the location on viewing surface 850, shown in FIG. 8, of the lower left hand corner of the viewing window. Other reference points such as the center of the desired window, or any other point in the window may serve equally well to locate the viewing window.

It should be mentioned that, although the present discussion envisions moving a window over a large display surface, the converse operation is equally valid. Thus, for example, by considering the window fixed at the origin, all graphical data on the entire potential viewing surface, i.e., this potential surface itself, can be initially or subsequently moved by including an additional displacement branch in the data structure. Since it is possible to reflect this translation in all (incrementally plotted) picture parts, the entire potential viewing surface is effectively moved with respect to the origin-based window.

When no edge violations are involved, subtractor 620 in FIG. 10 forms the difference signals representing the displacement from the reference point of the currently specified point. These signals are then applied to $x$ and $y$ registers 377 and 378 where they specify the location of the illuminated point on CRT 142. When the window is an origin-based one in the sense described above, or is displaced an integer multiple of full window distances from an origin-based window, registers 377 and 378 are loaded by transferring the necessary number of lowest order digits from register 354.

The sequence of operations is somewhat different when an edge violation occurs. It will be assumed for the present discussion that the desired viewing window is located with its lower left hand corner at the origin of surface 850, i.e., the window is an origin-based one. Register 605 therefore contains signals representing an all-zero indication. It may prove helpful during the following description to refer to the available viewing surface 850 in FIG. 8, and the various coordinates superimposed thereon. The grid shown in FIG. 8 represents a plurality of viewing windows translated a distance equal to integer multiples of the display surface of CRT 142 from an origin-based window. For illustrative purposes it will be considered that CRT 142 provides a 1024-by-1024 point display. $x$ and $y$ registers 377 and 378 are accordingly required to store only 10 binary digits. For purposes of the present discussion buffer register 350 will be assumed to have only 12 digits although no such limitation is essential to the present invention.

If two identical display words 001010101010 corresponding to $x$ and $y$ coordinates are entered in sequence into buffer register 350, a point will be displayed at a point illustrated as $X_1$, $Y_1$ in FIG. 8. Here the low order ten digits of each word are transferred directly to the corresponding $x$ and $y$ registers. Where the capacity of register 350 permits, both words could be loaded and transferred concurrently.

When (with the $y$ coordinate word remaining as 001010101010) the word corresponding to the $x$ coordinate of a display point takes on the value 011010101010, however, the edge violation system becomes operative. The $x$ and $y$ registers 377 and 378 are loaded as before. In addition, a signal is delivered by way of lead 604 to left-right register 640, thereby indicating a first order violation in the horizontal ($x$) direction. Register 604 may conveniently take the form of a reversible binary counter, a ring counter or similar device for accumulating edge violation occurrences. Register 640 is conveniently arranged to be in the all-zero state when no edge violations have been encountered. The specification of an $x$ coordinate of 011010101010, corresponding to point $X_1'$, $Y_1$ in FIG. 8, then causes the count of register 640 to be advanced by a single increment. The presence of one or more nonzero bits in register 640 causes override control 650 to be set. Override control 650 typically comprises a two state device such as a flip-flop.

OR gate 601 allows this same result when an equivalent condition exists in register 630 corresponding to a violation of vertical edge violation, i.e., an overly-large $y$ coordinate word.

If the $x$ coordinate specified had been 101010101010, corresponding to point ($X_1''$, $Y_1$) in FIG. 8, a second order left-right edge violation would be indicated and register 640 would be incremented by two. Both of the $x$ coordinate violations described so far have been in the positive coordinate direction. If a point like ($X_2$, $Y_2$) in FIG. 8 had been specified the contents of register 640 would be decremented by one. Similarly, higher order left edge violations give rise to higher order decrements in the contents of register 640.

Any nonzero indication in either register 630 or 640 indicates an edge violation and will result in the setting of override control 650. Whenever registers 630 and 640 are both in the all-zero state a signal will be provided by AND gate 602 which resets override control 650. When the override control is in the reset condition it has no effect on the display of the point specified by $x$ and $y$ registers 377 and 378. When override control 650 is in the set condition, however, the intensity control circuit 550 in FIG. 9 is inhibited; the screen is then not illuminated during the current display interval.

The advantages of this method of intensity signal inhibition is apparent when it is recalled that the display of the present invention can operate in an incremental mode. Thus, successive points are specified by incremental extension of preceding points. As an example, if the $x$ coordinate of point $(X_1, Y_1)$ in FIG. 8 were given as 001010101010, and $(X_1', Y_1)$ is to be the next point, all that need be specified while in the incremental mode is an $x$ increment specified by 010000000000. An additional identical increment will serve to identfy point $(X_1'', Y_1)$.

Each of the last two increments will, of course, indicate a right edge violation resulting in unit advances by register 640 from an assumed initial all-zero state. Thus, override control 650 will be set during the display intervals corresponding to points $(X_1', Y_1)$ and $(X_1'', Y_1)$. If a negative $x$ increment indicated by 100000000000 (with appropriate indication of negative sign) is now specified, the count of register 640 will then be decremented by two and an illuminated point will again appear at point $(X_1, Y_1)$.

Using the counting techniques described above, edge violations arising from successive large increments are readily accumulated in registers 640 and 630 corresponding respectively to violations in the $x$ and $y$ directions. Even through a given increment is not itself large enough to represent distances corresponding to one or more window widths, it may, when added to the coordinate of the preceding point, prescribe a position beyond the boundary of the current window. This apparent difficulty can be easily removed using combining networks indicated by XSUM 611 and YSUM 612 in FIG. 10.

If, for example, the contents of $x$ register 377 corresponding to the preceding point be taken as 1010101010 and the $x$ increment for the present point is indicated by 1000000000, XSUM network 611 forms the sum of these. The resulting sum gives rise to signals for incrementing register 640 and inserting the correct positioning information in register 377. Corresponding operations are performed by YSUM network 612 when a $y$ increment, when added to the previous contents of the $y$ register 378, indicate a $y$ direction edge violation. In appropriate cases XSUM network 611 and YSUM network 612 may actually be part of the increment generator.

Because display time would otherwise be wasted during a period when override control 650 is set, it proves advantageous to speed up display processing operations during such times. This is possible because the settling time required in the plotting of an intensified point is not required when the intensity control is inhibited. When override control 650 is reset, however, normal speed is resumed. This speed change feature is reflecated in FIG. 10 by display clock 613 which is responsive to override control signals.

FIG. 11 shows an alternate form for effecting edge violation control according to the present invention. FIG. 11 is a flow chart with labeled blocks corresponding to steps in the algorithm associated with the method of operating on data signals to accomplish the desired blanking and unblanking. A correspondence between certain of the steps shown in FIG. 11 and certain of the hardware operations described above in connection with FIG. 10 will be clear to those skilled in the art.

The first step requires that an $x$ word be read from memory. As before, a 12-bit word will be assumed, although any number of bits may be used. At step 2 a reference position corresponding to the current window is subtracted by conventional programming means from the $x$ word read. The reference position is separately provided by initializing signals supplied by user on program direction. The difference signal is then loaded into the $x$ register. Because the size of the $x$ register has been chosen to be only 10 bits long for the present example, there will be times when an overflow or underflow will be present. That is, the difference signals read will in some cases represent a negative number of a too-large positive number. These conditions are shown at step 4.

When an overflow or underflow is found to exist count representing the edge violations encountered must be correspondingly incremented or decremented. This count is conveniently stored as the contents MSB (most significant bit) software register. The modification is accomplished using standard programming techniques associated with the local computer being used.

After modification at step 5 (when required) the contents of the MSB register are tested for an all-zero state at step 6. A nonzero state causes the override indicator to be turned on causes subsequent operations to proceed at the higher speed possible when no intensification is required.

At step 8, assuming an all-zero state had been found at step 6, the contents of the $y$ MSB register (corresponding to $y$ coordinate overflows/underflows) are similarly tested for the all-zero state. When both MSB registers are found to be all-zero, the override control is reset and normal intensification occurs at the normal rate.

EXECUTIVE SYSTEM

FIG. 4 shows control logic 303 interacting by way of arithmetic unit 304 with memory 132. This interaction, involving stored programs in memory 132, may be grouped together under the heading of executive system techniques or methods. This combination of hardware and programs performs the necessary control over the several important bookkeping functions necessary to effect the efficient manipulation of graphical data signals. These methods relate to at least the following separate procedures: interrupt handling, data transmission, memory management, and display management. Each of these methods involves separate operations on the graphical data signals and program signals and will be discussed separately.

As was mentioned earlier, display information and input and output data are handled on an interrupt basis. According to one method of achieving successful interrupt centered operations, all interrupt conditions (such as a data input from a light pen, a CRT edge violation, or a command with an interrupt bit set) cause a cessation of normal display mode operation. Concurrently, transfer is made from the point within a set of graphical data being scanned to a particular subroutine associated with that kind of interrupt signal. The particular association of a subroutine with a particular interrupt signal may be modified by well-known programming techniques if the response to that signal is to vary in accordance with changing circumstances within the display console. For example, when a light pen input is sensed, normal display recirculation ceases mementarily while the local computer 130 interprets the input signals or instructions identified by the input signals. These typically involve operations directing control programs to move a particular object being displayed by modifying the data stored in memory 132. As will be recalled, a move operation may require a simple branch block alteration. When this modification is complete, control is again transferred back to the normal display mode where the data displayed will now be in the newly directed position.

Automatic priority interrupt 380 shown in FIG. 4, provides one means for identifying the source of a particular interrupt signal. According to well-known techniques, this automatic priority interrupt 380 accepts a signal from display processor 140 or from individual input devices and typically sets a flag in the form of a flip-flop or a similar device corresponding to the particular source of the interrupt signal. Control logic 303 then interrogates the sequence of flags and identifies the one which has been set.

An equivalent operation can be accomplished at local computer 130 without resorting to a hardware implementation of the priority interrupt. When an interrupt signal in any form is detected by control logic 303, transfer can be made to a list of instructions which tests a set of flags to determine the cause of the interrupt.

Several program instructions in the list are ordinarily used to test each flag. The first instruction of each set typically tests a resettable flag which responds to the input signal. Control logic 303 in cooperation with skip control unit 365 causes this first instruction of each set of instructions to be executed in turn to determine if the corresponding flag has been set. When a no flag indication appears for a given first instruction of a set, transfer is then made to the first instruction of another set and so on until a flag is detected. Thus the first instruction is of the transfer on no flag type. When a flag is detected, control is returned to control logic 303 which then proceeds as it would in response to a signal from the automatic priority interrupt 380.

The communication link between the local computer 130 and central computer 101 typically takes the form of a voice grade telephone line. Modems for translating the computer-derived information into channel compatible signals are typically of the class 201B Dataphone data sets. Using these sets, communication over the data channel is at a rate of approximating 2000 bits per second.

Part of the graphical console executive system also pertains to the control of communications over this data channel. Operating on an interrupt basis, this portion of the executive system enables the data sets, provides buffering for input and output data streams and detects and corrects errors.

Interaction between local computer 130 and the console user often results in changes in the programs and graphical data stored in memory 132. Because identical programs and data are stored in memory 103 of the central computer 101, these changes must be communicated from the local computer to central computer 101 using the abovementioned communication facilities. It proves convenient, however, not to transmit these changes as they occur at the local console 120. Instead, a record is kept in memory 132 of inputs that cause changes in the stored information in memory 103. When the quantity of this information reaches a preselected amount, or when communication is to be had between the local and central computers for other reasons, a sequential train or queue of the input information is transmitted with appropriate identifying information to central computer 101. The identifying information is interpreted at the central computer by central processor 102, new information entered into memory 103, and the program executed at the central computer to the extent that the equivalent program has been executed at the local computer. This process will be more fully described below in the section dealing with synchronization of the local and central computers.

Another important aspect of the executive system relates to the management or allocation of local computer memory 132. FIG. 12 illustrates a typical organization for local computer memory 132. Shown there are a block table portion 801, a data block portion 802, an executive program portion 803 and an unused portion 804. Under typical console operation, in a memory having approximately 8000 18 bit words, the proportion dedicated to each of these functions is illustrated at the right in FIG. 12.

The purpose served by this memory organization is that of providing at the local computer console a very large virtual memory (theoretically limited only by the size of central computer memory 103 and 107). According to the method of memory organization of the present invention, all programs are broken into blocks of variable size. These blocks have no connection to the data structure blocks, i.e., node blocks, leaf blocks, etc. Each of the blocks is assigned a unique fixed-length (typically 17-bit) identification number before it is transmitted from the central computer to the local console; all references between blocks are in terms of these identification numbers and an offset within the block. The identification number is also used to request a block from the central computer.

To facilitate block referencing at the local computer, every block in the data block portion 802 of local computer memory 132 is assigned an entry in the block table 801, which table is also in memory 132. This entry establishes the correspondence between the block's identification number and its location in the data block portion 802 of memory 132. Such a correspondence makes it possible to easily relocate blocks within memory 132. Only the memory address in the block table entry corresponding to a particular block need be updated when that block is relocated in memory.

When an interblock reference is encountered while sequencing through a portion of memory 132, a search of the block table 801 is made for the indicated identification number. When this number is located, that portion of the reference word containing the identification number of the reference is replaced by the block table entry address. Thus, on succeeding executions of that instruction containing the reference, no search of the block table is required but rather direction is made directly to the appropriate data block.

When the block corresponding to a referenced identification number is not presently in memory 132, the block table will not contain the corresponding identification number. At this point, a command will be issued by way of the communication portion of the executive system to the central computer 101 requesting the referenced block. Upon receipt from central computer 101, this block is assigned a position in the data block portion of memory 132 and a corresponding entry made in block table 801.

When a block is removed from local memory 132, the corresponding entry in block table 801 is also removed. Concurrently, a search of every block in the data block portion 802 of memory 132 is made to find any block table entry address references corresponding to the demised block. These references are then changed back to the original identification number references. Thus, any future references to the associated block will result in a call to a central computer 101 rather than to local memory 132. When a block is removed from memory 132, it need not, of course, be returned to central computer 132. That portion of memory 132 vacated by the removal of a given block is added to the unused portion 804 of memory 132.

Another portion of the executive system is the display management subsystem. As with many of the other portions of the executive system, the display management subsystem can be implemented by hardware means or a combination of hardware and program interaction.

The display management portion of the executive system performs a semi-interpretation function in translating the program and data information stored in memory 132 into a visual display observable on CRT 142. That is, the display manager provides a greater degree of feasibility than would be provided, for example, by a system that does no more than scan a sequence of display information. With a system incorporating the latter technique, each point must be completely and separately specified. In the interpretive or semi-interpretive mode in accordance with the present invention, a reduced amount of graphical display data is required and an increased amount of program data is required. It is this extensive programming requirement which allows the highly structured graphical data to be woven into a completed picture by a tracing operation within memory 132.

The interpretative programs of the display manager, or an equivalent hardware implementation, maintain a running account of the point within the structure information that is presently being processed, and what the next occurrence of a display item (a leaf) will be. The display manager maintains appropriate push-down lists which are added to with each reference to a lower level of the hierarchical structure.

When, for example, data is structured as in FIG. 3C, and a command to display the picture part identified with node 370 is executed, several steps are involved. First, the identification name or number of node 370 is stored in a node pushdown list and the first branch emanating from that node is traced. Since the node that this branch points to (node 350) is a nonleaf node, it too will have its identification name or number added to the node pushdown list. The first of the out branches associated with node 350 will then be traced. Since this points to a directly displayable (leaf) node 310, display processor 140 is allowed to gain access to the appropriate sequence of graphical display words in memory 132.

While the particular occurrence of leaf 310 is being displayed, central processor 131 under the control of display management subroutines is continuing its processing. It will be recalled that access to memory 132 by display processor 140 is on a cycle stealing bias, i.e., display words are accessed between executions of instructions by central processor 131. Thus while leaf 310 is being displayed central processor 131 and display management programs, by making reference to the pushdown list, identify the next branch emanating from node 350 and the leaf node (320) on which it terminates. This parallel processing of graphical data and executive routines permits higher speed, more efficient operation of the graphical console. In many cases, little or no delay is encountered when passing from one leaf block to another. This is possible even when display processor 140 is operating at maximum speeds compatible with the limitations of available CRT deflection systems.

When the last out-branch associated with node 350 is being processed, the display management system, with reference to the node pushdown list determines the next higher order node, here 370. A search for the next unexecuted out-branch associated with node 370 is then made and the terminal node of this branch identified. In this case, the new terminal node is again 350 so that, upon completion of the display of the last leaf associated with the last out-branch of node 350, control is again directed to the first out-branch associated with node 350.

If the new terminal node had not been node 350, the identification number for node 350 would be removed from the node pushdown list and that for the (different) new terminal node entered in its place. When all of the lower order data associated with the last out-branch of a node has been executed, the identifying data corresponding to that node is removed from the pushdown list. If the node in question is that associated with an entire picture (as, for example node 370 in the present discussion) control is passed back to the routine which called for the picture.

Variations of the above techniques are, of course, possible. In particular it sometimes proves profitable to maintain a pushdown list corresponding to the sequence of branches leading to the leaf or other node currently being displayed.

The maintaining of a node pushdown list is especially valuable in identifying light pen strikes. That is, when a light pen input indication occurs, reference to the sequence of push down list entries serves to rapidly identify the display entity being pointed at. The advantage of maintaining a record of a sequence of hierarchical branches, by a pushdown list or otherwise, obtains because a cumulative total of the relative positioning vectors associated with the branches can easily be maintained. With this accumulation, the positioning of a display leaf can be accomplished by specifying a single positioning command rather than by requiring the summation to be performed at the time the leaf is finally identified.

SYNCHRONIZATION

Because equivalent programs are executed at both central computer 101 and local computer, 120, and because only local computer 120 responds immediately to user input commands in real time, provision must be made to occasionally update information in central computer 101. If changes are made in the programs or data at local console 120, an equivalent change must be made at central computer 101. Otherwise, when the latter is consulted, it may respond erroneously because it did not properly interpret the request.

According to one embodiment of the present invention all real time inputs to local console 120 from a light pen, keyboard or otherwise are conveniently stored in local memory 132. These inputs, which lead to desired changes, additions and deletions of the program and graphical data stored in memory 132 (and correspondingly in central computer memory 103) are placed in an allotted portion of memory 132 in order of their occurrence, i.e., they are used to form a queue.

Requests are made of central computer 101 by local console 120 in at least three circumstances. The first of these circumstances involves a request by local computer 130 or display processor 140 for a block of program or graphical data which is not presently in local memory 132. Other requests for assistance made by console 120 to central computer 101 occur when a program referred to in local computer processing is too large or is otherwise unsuitable for efficient execution locally. Such programs typically involve complex circuit analyses routines and are most readily executed at central computer 101. Other instances requiring central-computer/local-computer, interaction occur when the number of real time inputs affecting the programming and data contents becomes so large that the queue of such changes, etc. threatens to overflow its allotted portion of local memory 132.

When, for the above-mentioned or other reasons, a request is made for central-computer/local-computer interaction, signals corresponding to the information contained in the locally-stored queue are transmitted via modems 191 and 190 and associated data channel 106. These signals are accompanied by other signals useful in maintaining synchronization between the local and central computers. Additionally, of course, signals are sent which designate the primary reason for the computer-to-computer interaction, e.g., to obtain an out-of-local-memory block, etc.

One type of synchronizing signal sent from local computer 130 to central computer 101 relates to the number of operations which must be executed by central computer 101 before it is again in synchronism with local computer 130. The interpretive facilities of either or both of the programmed controlled processors associated with the respective local and central computers are used to determine the number of instructions which must be executed at central computer 101 before it is again in step with local computer 130.

The synchronizing signals are conveniently arranged to precede the queue information signals which in turn are advantageously arranged to precede the request for assistance when appropriate. This arrangement allows central computer 101 to anticipate the extent of the changes, etc., that may be required and, in addition, to set up appropriate indexing means for accounting for the queue information. Thus, the queue information may be executed by central computer 101 as it arrives, or an entire queue may be stored for later processing. Of course to achieve the desired speeds of operation, including indirect user interaction with central computer 101, the queue information is usually processed very soon after receipt. The execution of queue information prior to any response to local computer requests insures that the response will be made with knowledge of the latest real time inputs. In appropriate cases, such as where the real time inputs could not effect the response to a request from the local computer, and where speed of response is of paramount importance, the order of the computer-to-computer signals may be modified.

FIG. 13 illustrates one hardware embodiment of the synchronization feature of the present invention. Shown in local console 120, in addition to local memory 132, local central processor 131 and local controller 133, is local step control counter 901. This counter 901 is incremented at appropriate points in the execution of the programs in memory 132. When a communication is made between the local and central computers, signals representing the state of counter 901 are conveniently arranged to precede the queue information. These count signals are transmitted by way of modems 190 and 191 and associated channel 106 to central computer 101. There the count signals are used to preset step control limit counter 903 to a state comparable to that of local step control counter 901. The queue signals are then sent from local memory 132 to central memory 103. In appropriate cases, the counter setting information can follow the queue information.

At appropriate points in the execution of the program in memory 103, step control counter 902 is incremented as was its local counterpart 901. When the count in counter 902 exceeds that in counter 903 by 1 (as determined by central processor 102), the computers are again in synchronism, and any appropriate requests from local console 120 will be responded to by central computer 101. An appropriate signal indicating the resynchronization is advantageously sent back to local console 120 by way of channel 106 and associated modems. This latter signal may take the form of an anticipated response to a request made of central computer 101 by local console 120.

Another feature of the present invention relating to local/central computer interaction relates to the response of central computer 101 to a request for a program or data block not in local memory 132. As a block is sent to local computer 130 in response to such a request, any references in the requested block to blocks not presently in local memory 132 are identified and the corresponding blocks may be sent along with the requested block. Additionally, blocks to which references are made in the blocks which were referenced (and sent along with the requested block) in the requested blocks (all of which blocks are not in local memory 132) are likewise identified and the corresponding blocks sent along where appropriate. This "chaining" feature may be adapted to whatever degree is desirable. The degree may be specified by the console user by means of a signal sent to the central computer before any requests are made for blocks not presently in memory 132. Conveniently this signal specifying the desired degree of chaining may be generated under program control in response to a register set initially in controller 133.

The embodiment of the synchronization feature of the present invention shown in FIG. 13 is readily modified for the case where a predetermined (but not one-to-one) relation exists between the representations of an equivalent program in local memory 132 and central memory 103. According to this modified version central processor 131, acting under program supervision, controls the incrementing of counter 901 as before. The programmed supervision, however, involves the elementary interpretation of locally-generated commands and determines the number of central computer commands each such local operation would be associated with at central computer 101. The local counter is then incremented by this number. It is this count, then, that is sent to step control limit counter 903.

As previously mentioned, local computer 130, also requires help from central computer 101 when it encounters a portion of the user's program which is not practical or possible to execute locally. This decision is made by the user when the program is being written or as it is modified during an interactive session. A set of statements are available which allow him to bracket a portion of the program, indicating a portion that should only be executed at central computer 101. The bracketed portion of the program then is replaced by a special "demand help" statement in the local computer version of the program. When the program is running and local computer processor 131 encounters a "demand help" statement, the queue is sent to central computer 101 along with the synchronization (local step control) count. Before the central computer version catches up (synchronizes), however, it encounters one of the bracketing statements. This suspends the synchronization constraint and allows central computer 101 to proceed through the portion of program that it alone is designated to perform. When an end-bracketing statement is encountered, the central computer version of the user's program stops. At this time the central computer 101 typically sends unrequested blocks to local computer 130 which contains the results of the "central-computer-only" portion of the user's program. In one embodiment of the present invention when local console 120 receives unrequested blocks from central computer 101 which local computer 130 already has copies of, it deletes the old copies and keeps the new ones.

OTHER GRAPHIC SOFTWARE FEATURES

Routines in the graphic programming system can be divided into two distinct categories: those which are accessible to a user by call, and those that are invisible to the user but provide necessary services. In the first category are sub-routines for building and editing the user's Graphic Data Structure and for creating and linking non-display information to it. In the second category are programs that handle communication between central computer 101 and local console 120, and the translator programs that convert from internal central computer picture representation to formats required by local console 120. A dynamic storage allocator is used to allocate and free blocks that are used in the graphic data structure.

A library of local console sub-routine blocks is maintained in central computer auxiliary storage 107. These are kept in relocatable, linkable format since the executive system includes a linking loader that runs on local computer 130. The equivalent routines in the central computer version are also kept on a library file. An important aspect in the software system is the "unique ID maintainer." In the above section on the executive system it was pointed out that all program and data blocks in the local console 120 have an identification number (ID) number associated with them. A complete dictionary of all blocks with assigned ID's is kept in central computer 101. This dictionary establishes a unique correspondence between blocks in or referred to in the local console and the equivalent block in the central computer memory 103. Whenever the local console needs a block of any kind it asks for it by ID number. The ID table must be used to locate the desired block in central computer 101. The block is then converted to local console format or retrieved from the program file and sent over the communication link to the remote terminal. The unique ID assigned to a block is a dynamic operation that occurs during program execution and is completely invisible to the programmer.

A "real-time-input" simulator at central computer 101 becomes operative whenever one of the real-time statements is encountered in the central computer program. This simulation simply supplies the next argument (or arguments) found on the input queue sent over from local console 120. This allows the central computer to update its version of the Graphic Data Structure to correspond with events taking place at the remote terminal.

Many of the features of the present invention are fully realizable in either hardware and software (programming)

configurations, and at times by a combination of the two. Such equivalencies will be clear to those skilled in the art who seek to implement the present invention using particular machines, languages and the like. What has been described above is a total computer graphics system including the pertinent hardware units and the methods (algorithms) for operating on them and the signals generated by them.

Many variations within the spirit and scope of the present invention will occur to those skilled in the art. In particular many of the features of the present invention may be realized in a noninteractive (display only) system. In addition, straightforward modifications of the presently described system are possible to accommodate additional or different character generating or plotting techniques. The examples of bit configurations, word sizes and the like are not fundamental to the invention; equivalent applications are at once apparent to one operating under different detailed hardware restrictions. Additionally, many of the features of the time-shared central computer access are available using the local computer only, augmented in appropriate cases by an expanded memory.

What is claimed is:

1. An interactive graphical system comprising:
(A) a central computer comprising:
(1) means for storing hierarchically-structured graphical data signals,
(2) means for selectively operating on said hierarchically-structured data signals.
(B) at least one local console each of which comprises:
(1) local generating means for generating structured graphical data signals,
(2) a local memory adapted for storing structured graphical data signals equivalent to at least some of said signals stored at said central computer and for storing selected ones of said structural data signal generated by said local generating means,
(3) interpretive means for converting selected ones of said structured data signals stored in said local memory into display command signals,
(4) display means responsive to said command signals for generating a visual image,
(C) means for bidirectionally communicating graphical data signals between said central computer and said local console on a time-sharing basis.

2. Apparatus comprising:
(A) a central time-shared computer comprising:
(1) a central memory for storing structured graphical data signals,
(2) computational means for selectively operating on said structured data signals,
(B) at least one local console, each of which comprises:
(1) a local memory for storing structured graphical data signals equivalent to at least some of said data signals stored at said central computer,
(2) means for selectively operating on said data signals in said local memory,
(3) means for generating input signals for modifying said data signals stored in said local memory,
(4) means for storing indications of said input signals,
(C) means for communicating said indications to said central computer.

3. Apparatus according to claim 2 additionally comprising means at said local console for initiating requests for additional data signals, to be sent from said central computer, and means for communicating said requests to said central computer, and wherein said indications are communicated to said central computer when such requests are initiated.

4. Apparatus according to claim 3 additionally comprising at said central computer means responsive to said requests for nondestructively reading said additional data signals from said central memory and means for communicating said additional data signals to said local console.

5. Apparatus according to claim 3 additionally comprising means for communicating said additional signals to said local console, and wherein said additional signals are generated in response to said requests by said computational means operating on said data signals stored in said central computer.

6. The machine method of generating graphical data signals corresponding to a visually observable image comprising the steps of:
(A) generating on a machine a sequence of leaf data signals corresponding to each fundamental image element,
(B) generating on a machine linking signals which link selective ones of said leaf sequences to form subsequences of node signals, each of said node sequences corresponding to one of a covering set of image subparts,
(C) repeating step (B) with leaf sequences replaced by node sequences until the node signals formed correspond to a single node representing the entire image.

7. The method of claim 6 wherein the sequence of leaf data signals are generated by specifying a sequence of position and intensity signals corresponding to each point on said image element.

8. The method of claim 7 wherein said linking signals identify image subparts corresponding to preceding and succeeding linked subsequence signals.

9. In a system having first and second memories and corresponding first and second processors for performing equivalent operations on equivalent data signals stored in their respective memories, the machine method of establishing and maintaining synchronism with respect to the progress of operations by said processors comprising the steps of:
(A) generating a first set of signals representing information influencing said operations and available to one of said processors, but not available to the other of said processors,
(B) generating a second set of signals at said one processor representing the number of operations which must be executed in sequence by said other processor to bring into equivalence the data signals stored in both of said memories,
(C) communicating said first and second sets of signals to said other processor,
(D) executing sequential operations at said second processor, including those influenced by said first set of signals,
(E) generating a third set of signals at said other processor representing the number of operations performed by said other processor,
(F) terminating the execution of said operations by said other processor when the numbers represented by said second and third sets of signals are equal.

10. The method of claim 9 wherein said second set of signals is generated by counting the number of operations performed by said one processor since said first and second processors were last in synchronim.

11. Apparatus for storing data signals representing a visual image, said image comprising a plurality of fundamental sub-images which are each representable by a fundamental sequence of data signals, which apparatus comprises:
(A) means for storing said fundamental sequences of said data signals,
(B) means for storing signals which link selected ones of said fundamental sequences of data signals to form more comprehensive image subparts,
(C) means for storing a hierarchy of signals which link progressively more comprehensive distinct image subparts, the highest hierarchical signal being one for linking a covering set of said subparts.

12. A data structure maintenance system comprising:

(A) at least two separate storage media for storing said data structure, (B) means at one of said storage media for dynamically altering said data structure in response to local input signals, (C) means for accumulating said alterations at said one storage medium, (D) and means for transferring said alterations to at least one other of said storage media, and (E) time-shared means at said other storage media for duplicating said alterations.

References Cited

UNITED STATES PATENTS

| | | | |
|---|---|---|---|
| 3,071,753 | 1/1963 | Fritze et al. | 340—153 |
| 3,296,597 | 1/1967 | Scantlin et al. | 340—172.5 |
| 3,374,465 | 3/1968 | Richmond et al. | 340—172.5 |
| 3,399,401 | 8/1968 | Ellis et al. | 340—324.1 |
| 3,403,391 | 9/1968 | McCown | 340—324.1 |
| 3,422,419 | 1/1969 | Mathews et al. | 340—172.5 |
| 3,438,003 | 4/1969 | Byran | 340—172.5 |

PAUL J. HENON, Primary Examiner

P. R. WOODS, Assistant Examiner